Nov. 19, 1963   W. F. RIDENOUR ETAL   3,111,084
ADDRESSING AND IMPRINTING MACHINE
Filed June 13, 1960   14 Sheets-Sheet 1

INVENTORS
EDWARD A. STORCK
WAYNE F. RIDENOUR
BY
ATTORNEY

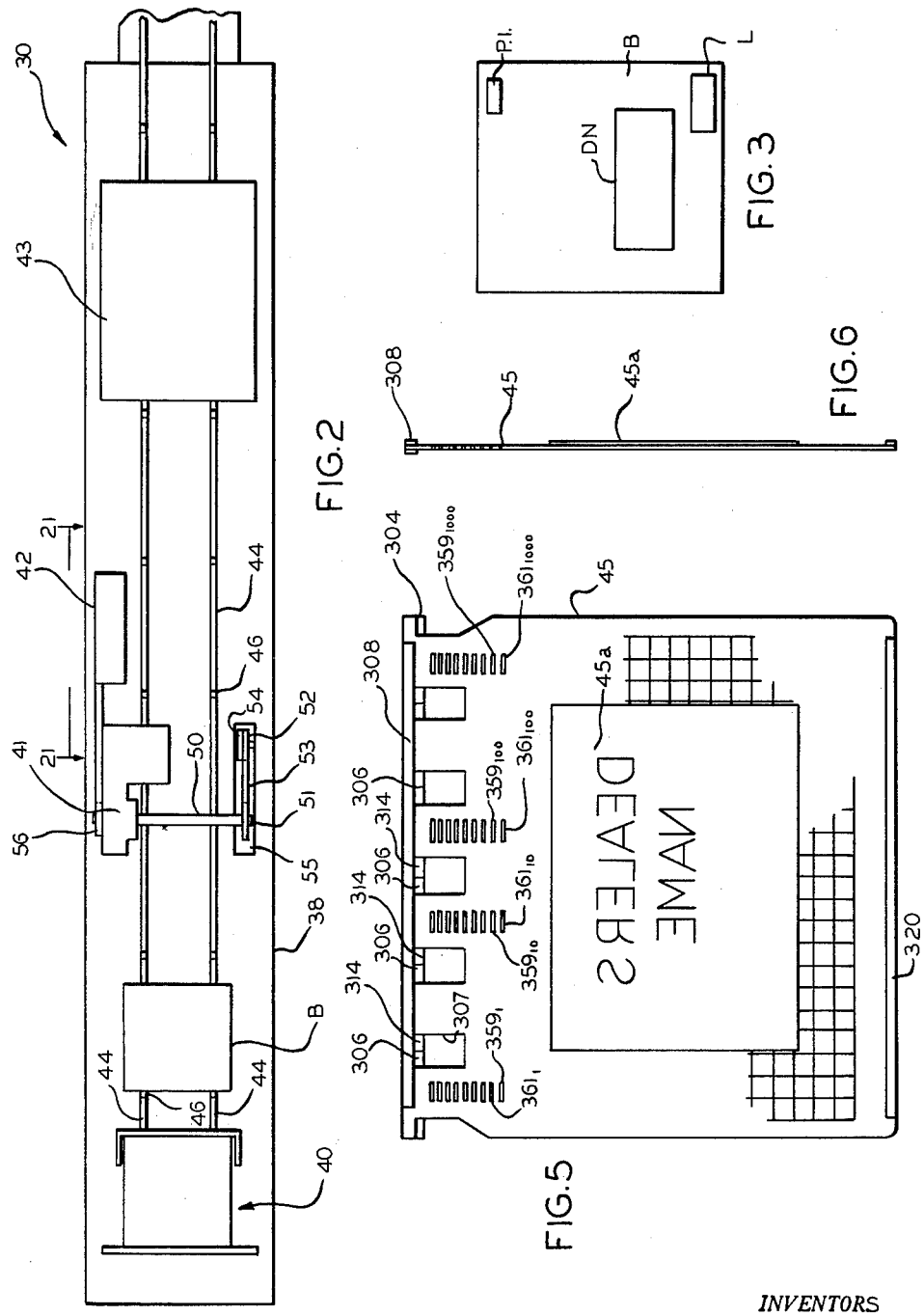

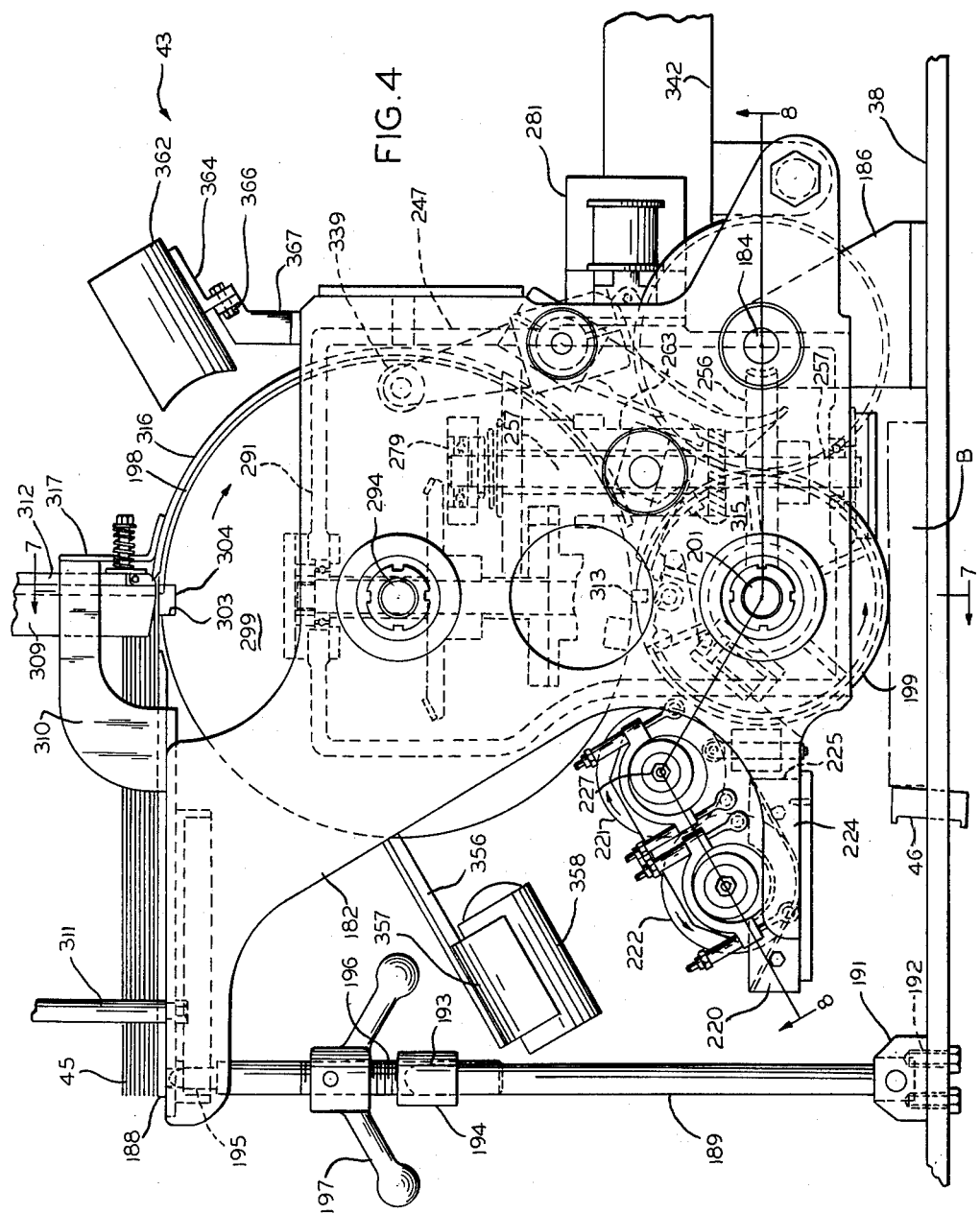

Nov. 19, 1963     W. F. RIDENOUR ETAL     3,111,084
ADDRESSING AND IMPRINTING MACHINE
Filed June 13, 1960     14 Sheets-Sheet 4
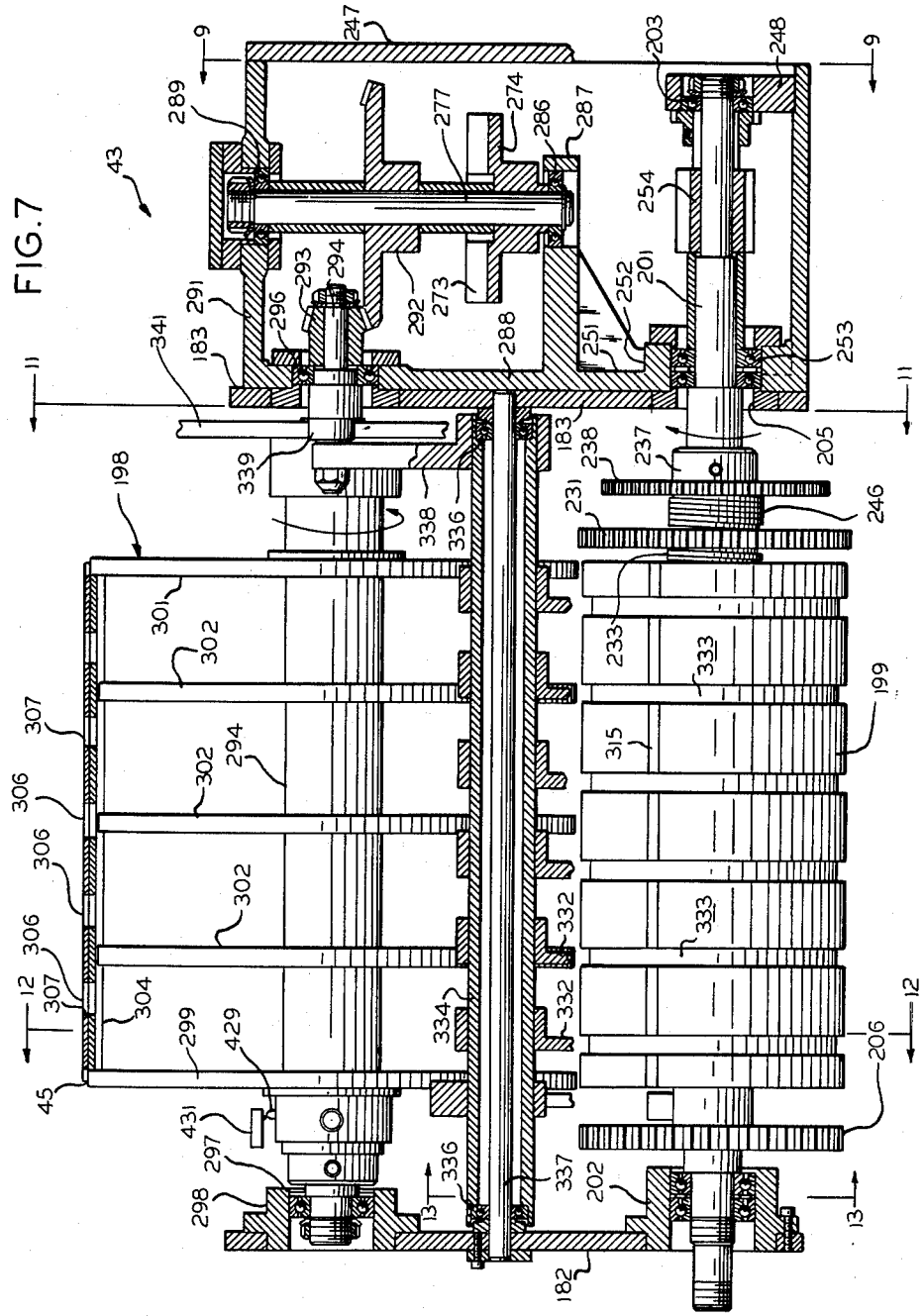
INVENTORS
EDWARD A. STORCK
WAYNE F. RIDENOUR
BY
ATTORNEY Nov. 19, 1963    W. F. RIDENOUR ETAL    3,111,084
ADDRESSING AND IMPRINTING MACHINE
Filed June 13, 1960    14 Sheets-Sheet 5

*INVENTORS*
EDWARD A. STORCK
WAYNE F. RIDENOUR
BY

ATTORNEY

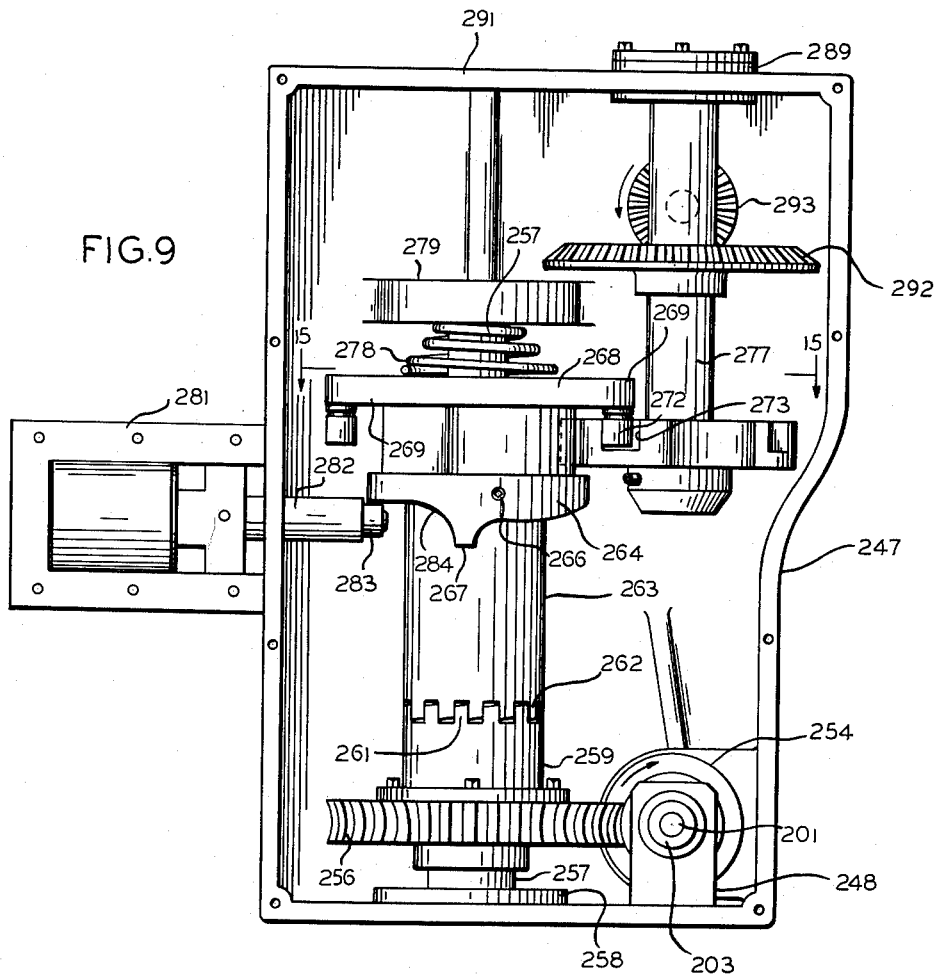
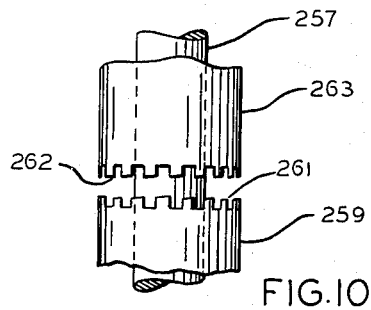

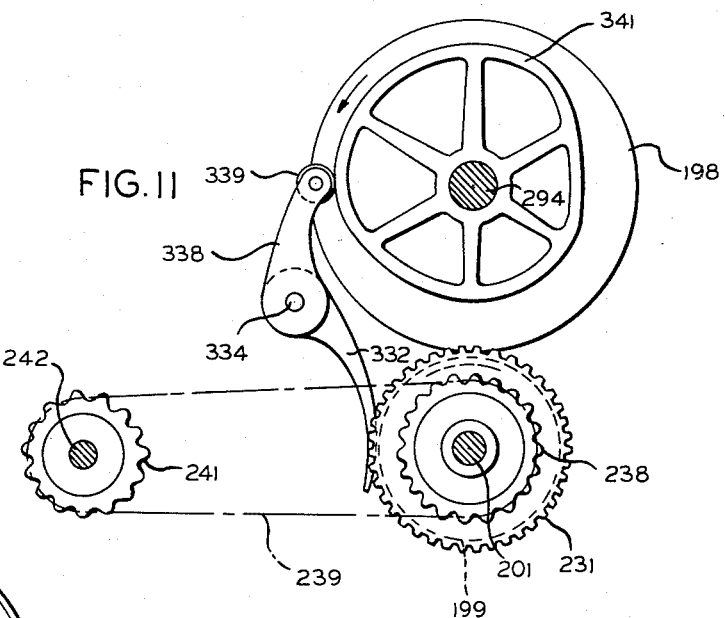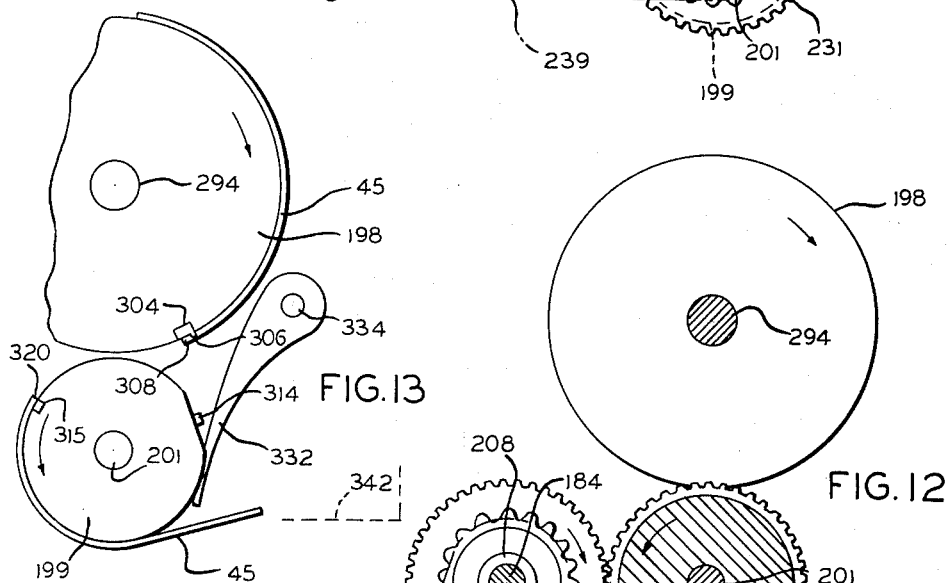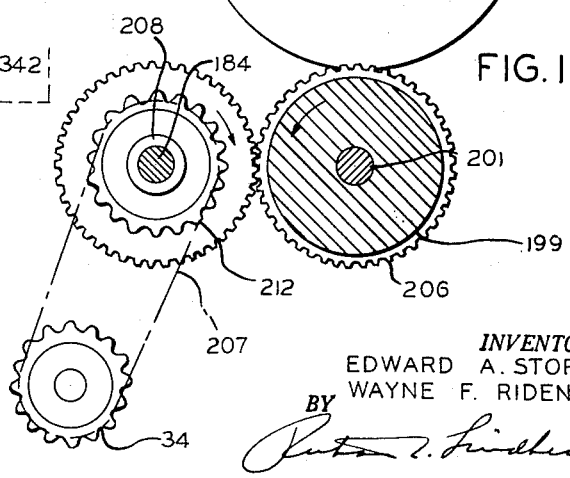

Nov. 19, 1963    W. F. RIDENOUR ETAL    3,111,084
ADDRESSING AND IMPRINTING MACHINE
Filed June 13, 1960    14 Sheets-Sheet 8
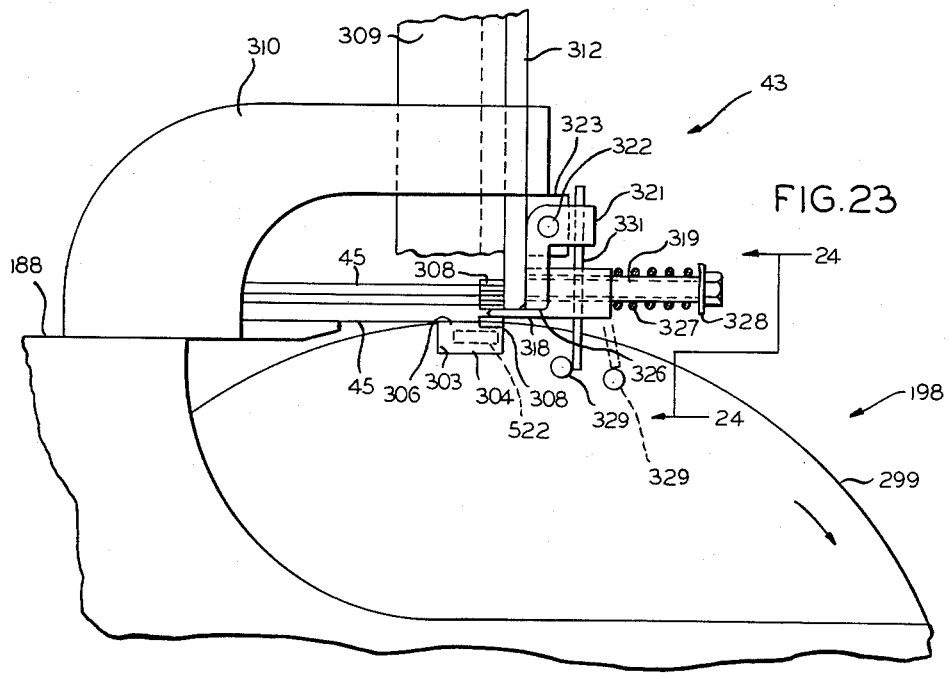
FIG. 23
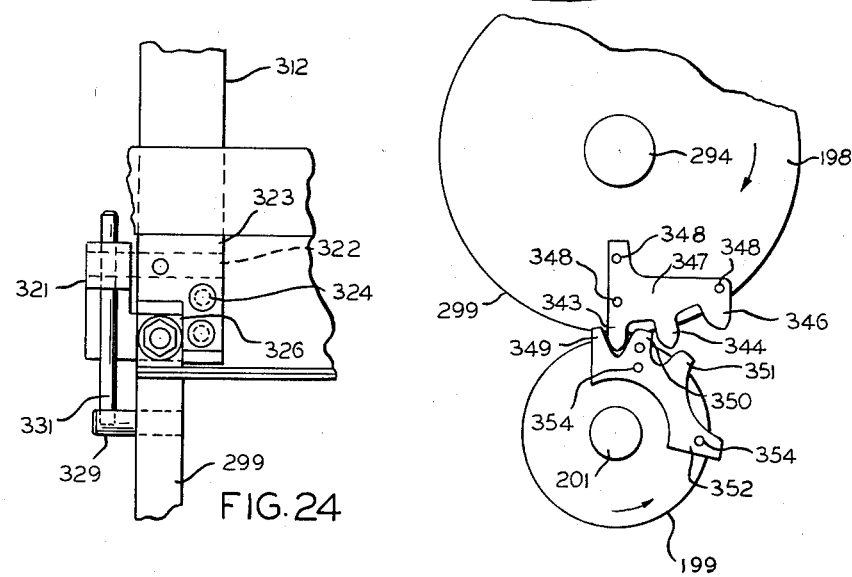
FIG. 24
FIG. 14
*INVENTORS*
EDWARD A. STORCK
WAYNE F. RIDENOUR
ATTORNEY Nov. 19, 1963 W. F. RIDENOUR ETAL 3,111,084
ADDRESSING AND IMPRINTING MACHINE
Filed June 13, 1960 14 Sheets-Sheet 9

INVENTORS
EDWARD A. STORCK
WAYNE F. RIDENOUR
BY
ATTORNEY

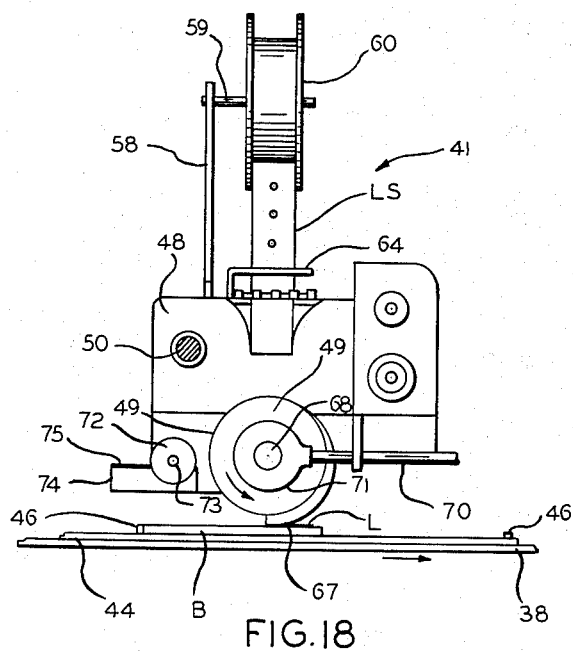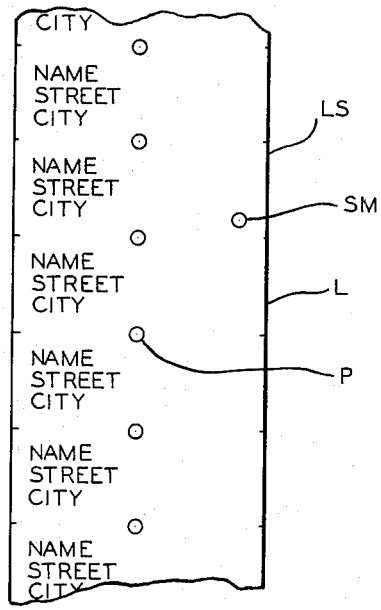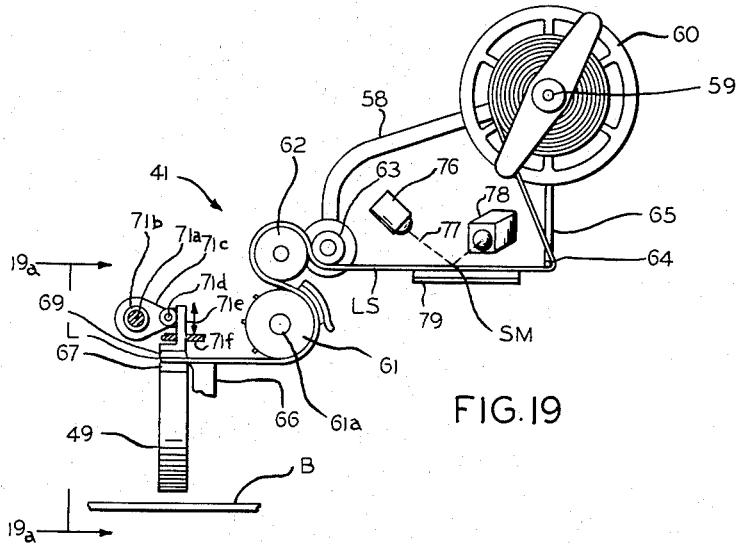

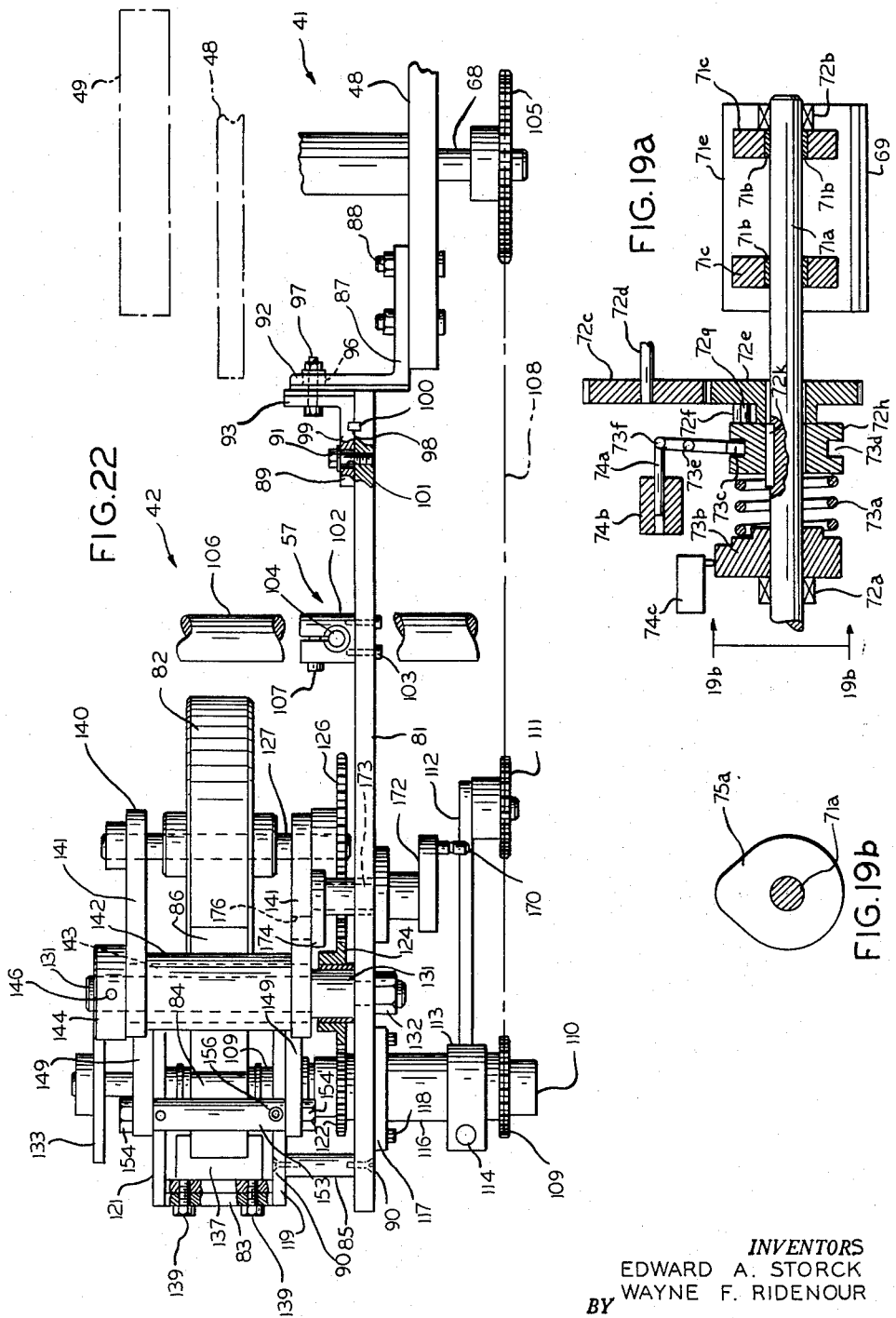

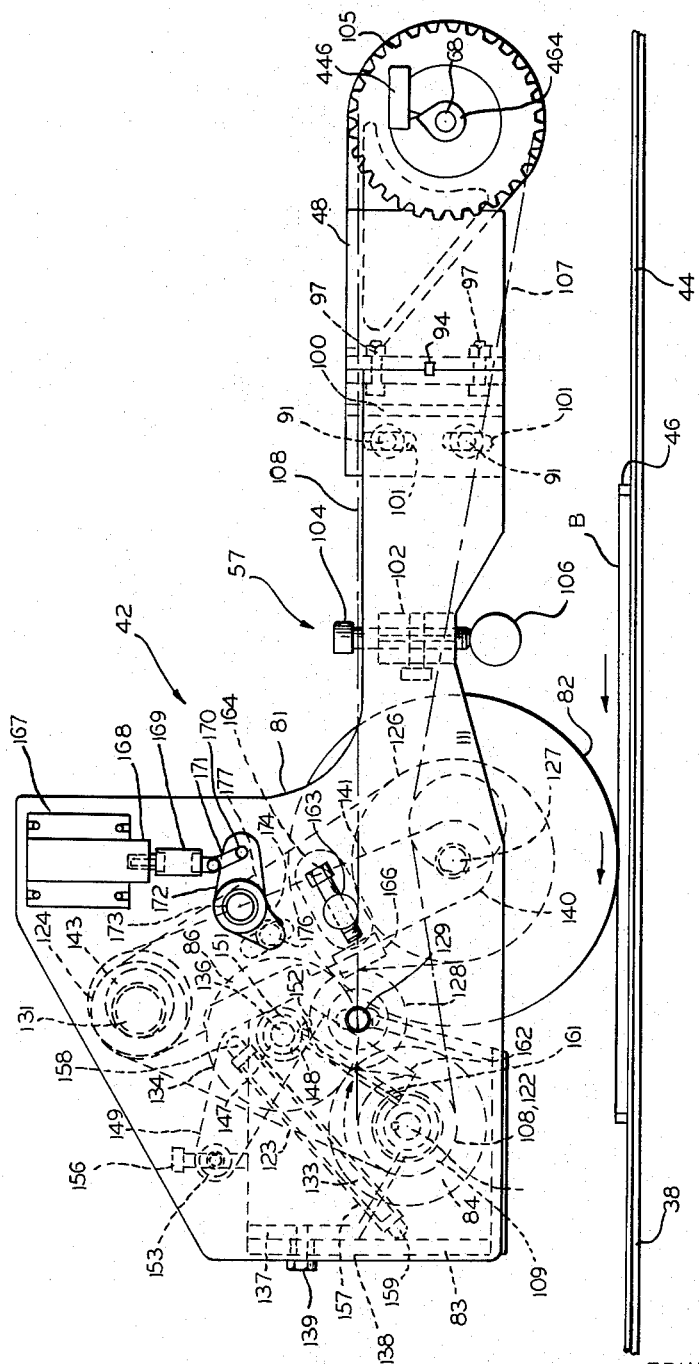

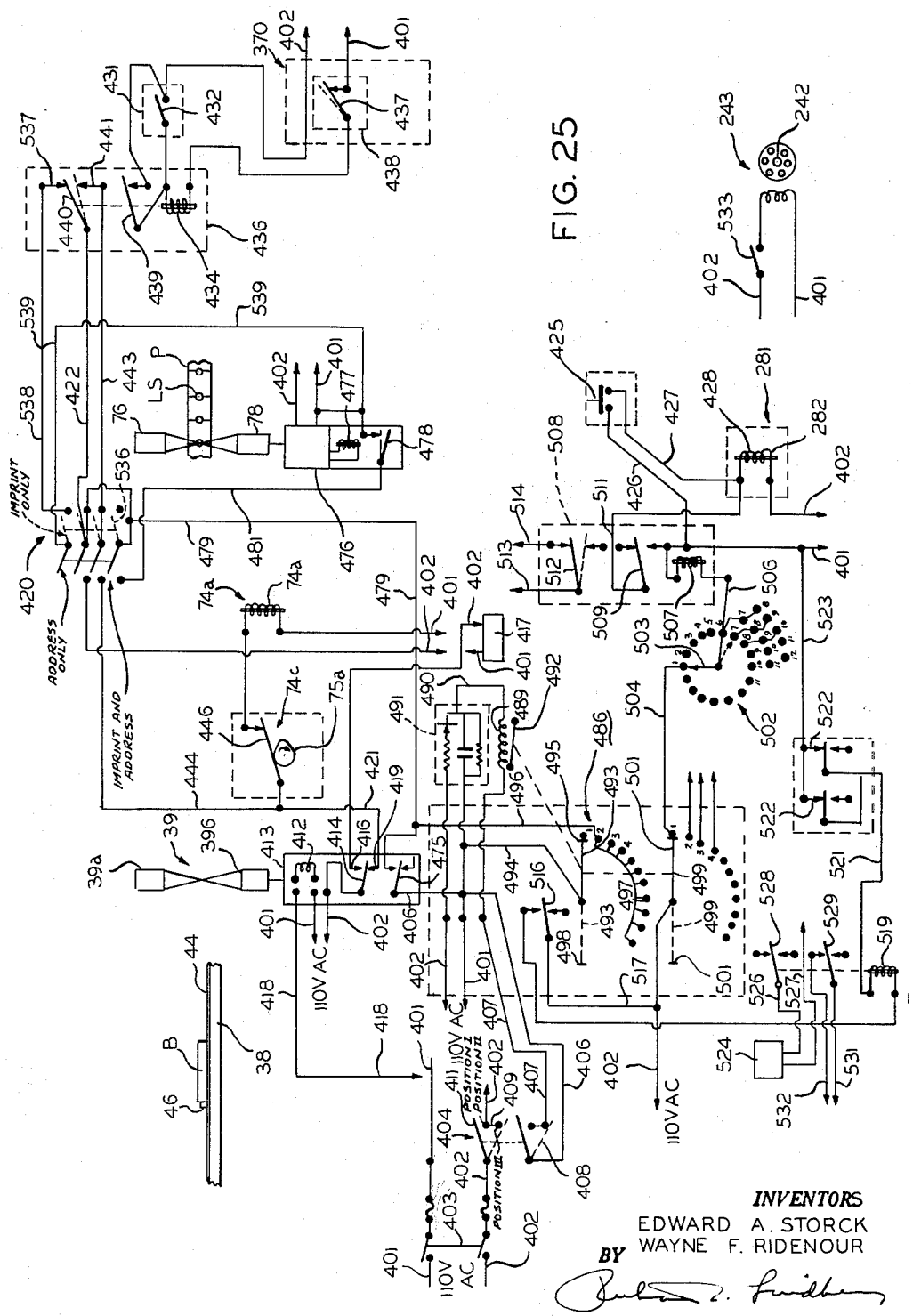

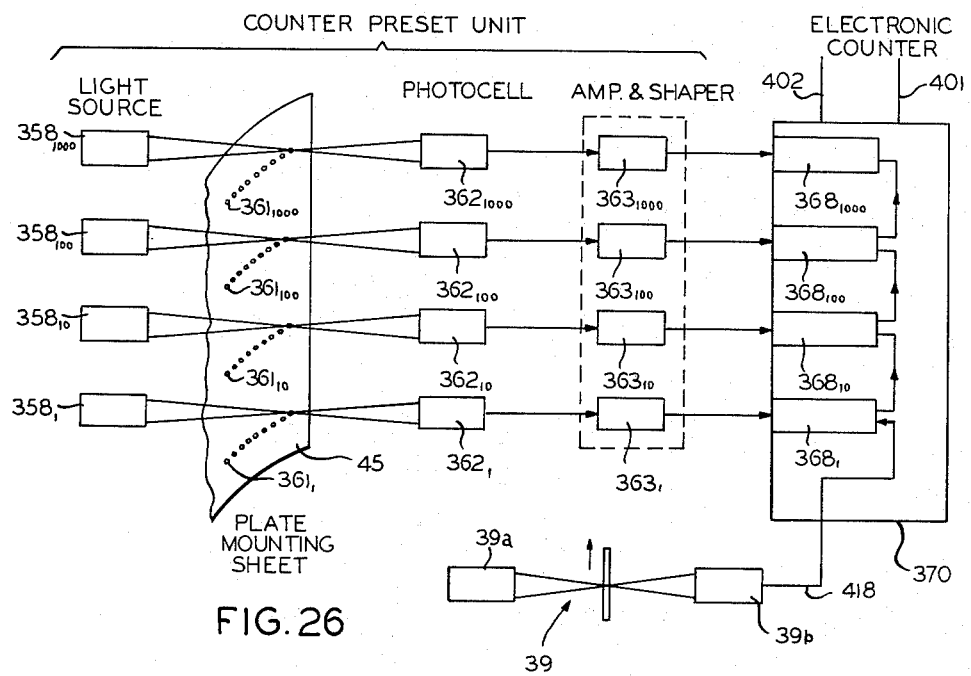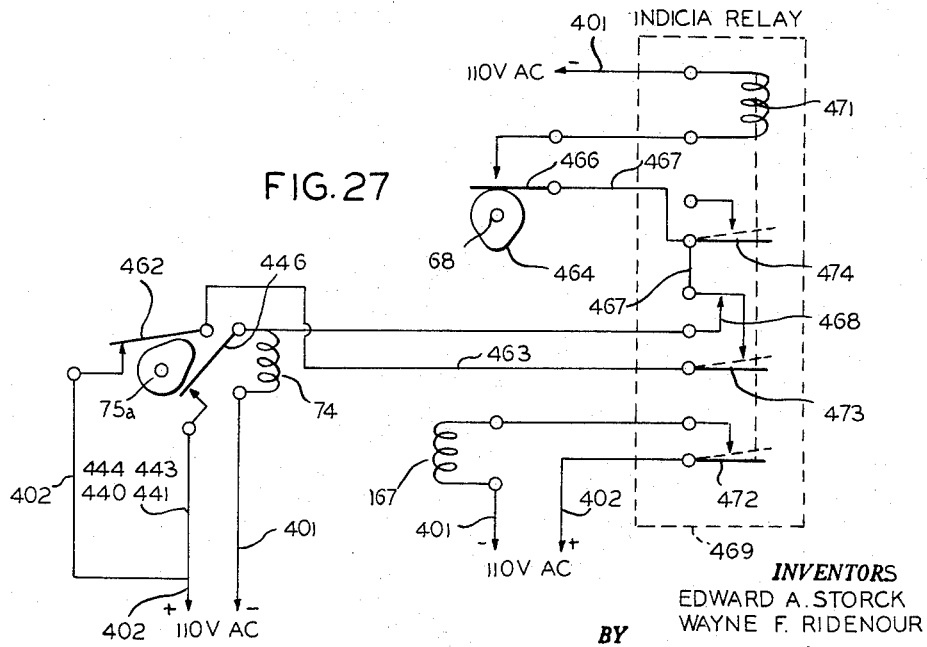

United States Patent Office 3,111,084
Patented Nov. 19, 1963

3,111,084
ADDRESSING AND IMPRINTING MACHINE
Wayne F. Ridenour and Edward A. Storck, Chicago, Ill., assignors to Cheshire, Incorporated, Chicago, Ill., a corporation of Illinois
Filed June 13, 1960, Ser. No. 35,772
17 Claims. (Cl. 101—47)

This invention relates to an improved machine for addressing magazines and for the imprinting of additional matter thereon identifiable with a particular area in which the magazines are circulated.

The invention herein is particularly adapted for use in the mass circulation of books or magazines having additional intelligence thereon identifiable with a local area. Manufacturers' house organs identified with their local distributors or dealers are examples. Automobile and farm equipment manufacturers commonly identify their dealers in such organs, and mail individually addressed copies to the end purchasers of their products. Additional copies of such house organs, also dealer identified, are desirably distributed from the dealer's place of business as single unaddressed copies which can be handed to the customers. Heretofore, the individual books have been addressed to individuals in an operation of one machine, the addressed copies being then run through an imprinting machine for placing the dealer's name on each copy, additional bulk, unaddressed, but imprinted copies for the dealer's use being prepared in such machine.

According to the present invention, both individual address labeling, as desired, and imprinting (both bulk and individual) is performed in a single machine. In performing such functions in an individual machine, use is made of an address label strip provided with suitable intelligence for signaling a change in a local dealer. Such signaling of the change is embodied in a circuit controlling the cycling of the imprinting mechanism, so that it will apply the new dealer's name to the books at a proper time.

Bulk copies for each individual dealer do not have address labels applied thereto, nor do they have postal indicia thereon indicating that the book or magazine postal rate has been paid by the publisher. The machine according to the present invention makes it possible to apply both individual addresses and postal indicia to mailing pieces, and to provide unaddressed or bulk pieces which have only the dealer's name and address or other intelligence thereon.

According to the present invention, the address strip is arranged to cooperate with an address applying head which applies an individual address to the mailing piece as desired, a signaling device being provided on the address strip to render the address applying head inactive when only imprinting of the bulk mail with the dealer's name is desired. The signaling device and circuits controlled thereby cycles a plate changing mechanism of an imprinter having an impression plate supporting roller. The plate changing mechanism thereupon places a new plate on the supporting roller, the cycling occurring with such rapidity that there is no gap in the application of a new dealer's imprint to the mailing pieces as they are moved in the machine.

With the foregoing considerations in mind it is a principal object of this invention to provide a combined address label applying and imprinting machine, both the address applying and imprinting being under the control of circuits including signal devices on the address strip to provide operation of the imprinting mechanism alone or the conjoint operation of the imprinting and labeling mechanisms.

Another object is to provide an impression or imprint carrying plate holder which can be sensed to determine the number of books to bear the imprinting alone, the structure sensing the plate cooperating with a count mechanism responsive in its operation to the count as determined by the plate holder and a further count as determined by a signal device on the label strip.

Another object is to provide a combined addressing indicia printing and imprinting machine capable of imprinting a prescribed number of imprinted but unaddressed mailing pieces not having the postal indicia thereon, and an additional number of imprinted and addressed articles also having the postal indicia thereon.

Yet another object is to provide a suitable mechanism for imprinting the books or magazines in groups having selected intelligence thereon, and to apply addresses and postal indicia on but a part of the books of any group.

Other objects and important features of the invention will be apparent from a study of the specification following taken with the drawings, which together describe and illustrate a preferred embodiment of the invention and what is now considered to be the best mode of practicing the principles thereof. Other embodiments may be suggested to those having the benefit of the teachings therein, and such other embodiments are intended to be reserved especially as they fall within the spirit and scope of the subjoined claims.

In the drawings:

FIG. 2 is a schematic plan view thereof;

FIG. 3 is a plan view of a magazine, and showing dealer's imprint, subscriber's address and the postal indicia applied thereto;

FIG. 4 is a front elevational view of the imprinting mechanism employed with the labeling and imprinting machine see in FIGS. 1 and 2;

FIG. 5 is a plan view of a plate holder for holding a dealer's imprint plate thereon;

FIG. 6 is a side view thereof;

FIG. 7 is a transverse sectional view taken along the line 7—7 of FIG. 4 looking in the direction of the arrows;

FIG. 9 is a view taken along the line 9—9 of FIG. 7, looking in the direction of the arrows, showing details of mechanism for initiating and completing a plate change in the imprinter mechanism seen in FIGS. 1, 2 and 4;

FIG. 10 is a detail elevational view of a dog clutch seen in FIG. 9;

FIG. 11 is a view taken along the line 11—11 of FIG. 7, looking in the direction of the arrows;

FIG. 12 is a schematic view showing a driving train for the imprinter mechanism seen in FIGS. 1, 2 and 4, said view looking in the direction of the arrows 12—12 of FIG. 7;

FIG. 13 is a schematic view showing details of structure for stripping a plate holder from the imprinting cylinder, showing a plate holder carrying another imprint plate moving into position to be supported by the imprinting cylinder, said view looking in the direction of the arrows 13—13 of FIG. 7;

FIG. 14 is a schematic view similar to FIGS. 12 and 13 showing mechanism for insuring that the transfer and imprint cylinders are synchronized at the instant of transferring a plate holder from the transfer cylinder to the imprint cylinder;

FIG. 18 is an elevational view of the address label applying head seen in FIGS. 1 and 2;

FIG. 19 is a schematic side view of the address label applying head seen in FIG. 18;

FIG. 19a is a schematic elevational view looking in the direction of the arrows 19a—19a of FIG. 19, showing details of label severing mechanism, and structure for interrupting the label severing operation;

FIG. 19b is an end view thereof looking in the direction of the arrows 19b—19b of FIG. 19a;

FIG. 20 shows an address label strip adapted to be used with the labeling head seen in FIGS. 19a and 19b;

FIG. 21 is a detailed elevational view of the indicia printing mechanism seen in FIGS. 1 and 2, said view looking in the direction of the arrows 21—21 of FIG. 2;

FIG. 22 is a plan view thereof;

FIG. 23 is an elevational view of a portion of the imprinter mechanism seen in FIG. 4, showing details of structure for effecting separation of an imprinting plate from the bottom of a stack thereof;

FIG. 24 is a view looking in the direction of the arrows 24—24 of FIG. 23;

FIG. 25 is a circuit diagram showing control circuitry for the addressing and imprinting machine according to the present invention;

FIG. 26 is a schematic showing the sensing of an imprinting plate holder to determine a count of bulk mail; and FIG. 27 is a circuit diagram for controlling the operation of the indicia printer seen in FIG. 4.

General Description of Machine

Figure 1:
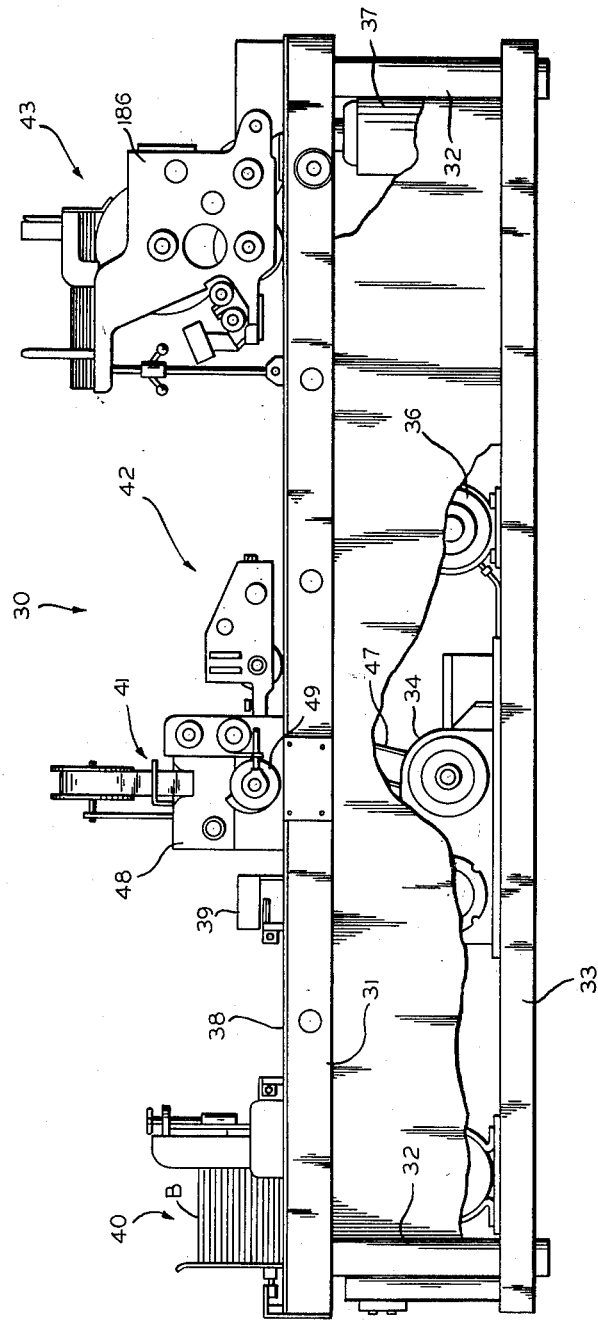
FIG. 1 is a front elevational view of a combined address labeling and imprinting machine embodying the improvements according to the present invention.

Referring now particularly to FIGS. 1 and 2 of the drawings, the adressing and imprinting machine according to the present invention is referred to generally by the reference numeral 30 and includes a table 31 supported at its corners upon legs 32. A lower platform 33 spanning the legs 32 supports a main drive unit 34, a vacuum pump drive unit 36 and an ink supply and pump 37. The table 31 has a top 38 supporting a feeder mechanism indicated generally by the reference numeral 40, said feeder mechanism being adapted to feed books or magazines for subsequent addressing and imprinting, or imprinting only, if desired. The table 31 also forms a support for the upper reaches of an endless conveyor 44 driven by the drive mechanism 34 and comprising a pair of endless strands as shown. Each strand is provided with evenly spaced conveyors lugs 46 which move in side by side relationship and engage the back edge of the book B which has been fed by the feed mechanism 40, the books B moving with the conveyor 44 in regularly spaced relationship along the top of the table 31.

The details of the feed mechanism 40 form no part of the present invention and may be as described in Doane Patent No. 2,555,325 and Ridenour Patent No. 2,606,681.

The books B are moved by the conveyor 44 past a photo-electric counting mechanism 39, and are then moved past an address labeling head indicated generally by the reference number 41, where those books of any group going to individual subscribers have an address label L, see FIG. 3, applied thereto.

In certain cases, as will be described in further detail, some of the books of a group are considered as bulk mail for distribution from a dealer's showroom or the like, and in such cases the books will be imprinted but not addressed.

After moving past the labeling head 41, the books move past an indicia printer 42, and those books which have been applied with an address label will also have a postal indicia P.I. applied thereto, see again FIG. 3. Such indicia shows the city or town where the books have been addressed, and shows that the bulk postage rate has been paid.

Those books of the group which have not been labeled at the labeling head 41 are likewise not provided with the postal indicia P.I., and such books are bulk mailed to a point where they may be distributed by methods other than the postal system, as from a dealer's showroom or the like.

All of the books B which have moved past the labeling head 41 and past the indicia printer 42 are imprinted individually by an imprinter mechanism 43, all of the books of any one group being in the nature of a dealer's name, address, etc. The imprinter mechanism 43 is arranged to support a plate holder 45 seen in FIGS. 5 and 6, and transfer an impression from a plate 45a supported thereon on to the book B seen in FIG. 3.

Details of Addressing Mechanism

The addressing mechanism 41, see FIGS. 1, 2, 18, 19, 19a, 19b and 20, includes a main frame 48 and a roller 49 for applying an address to each book. Roller 49 rotates in a direction seen in FIG. 18, to apply an address label L to the book B as it passes beneath the roller 49. The addressing head 41 is driven from a main drive shaft 50 having a sprocket 51 thereon which is spaced from a sprocket 52. A sprocket belt 53 is reeved between the two sprockets 51 and 52, and a sprocket 54 fast with sprocket 52 is driven by a sprocket belt 47 driven from the main drive unit 34. All of the aforesaid driving mechanism is supported within a housing 55 resting on the conveyor table 38, and the housing 55 affords a support for one end of the shaft 50, the other end of the shaft 50 being supported in a frame 56 supported on the table 38. The address labeling head 41 is adapted to be raised and lowered about shaft 50 as a center in accordance with thickness of a book B by adjusting means 57 seen in FIGS. 21 and 22, and cooperating also with the indicia printer 42.

As seen in FIGS. 18 and 19, the main frame 48 of the label applying head 41 has an arm 58 extending therefrom affording a support for a spindle 59 in turn supporting a reel 60. A label strip LS is carried by the reel 60, and the label strip LS consists of individual labels L, see also FIG. 20. As seen in FIGS. 18 and 20, the label strip LS has subscribers names printed thereon, these names being grouped according to a customers list of a dealer. The names are separated by a perforation P.

The address label applying head 41 includes an intermittently operating pin roller 61 driven from a shaft 61a, and the pin roller 61 serves to draw the label strip LS from the reel 60 over idler rollers 62 and 63. The strip LS is additionally guided under a finger 64 extending from an arm 65 depending from the reel support arm 58.

The label strip LS is fed by the pin roller 61 over a fixed knife 66 mounted on the frame 48 in timed relationship with the rotation of the address label applying roller 49 so as to be placed upon a raised pad 67 thereof. The address label applying roller 49 is fast upon a shaft 68 driven from the drive shaft 50 which is in timed relationship with the conveyor 44. The label applying roller 49 makes one complete revolution for each of the regularly spaced books B moving with the conveyor 44. It should be noted that the peripheral speed of the raised pad 67 is identical with the rectilinear speed of the book B.

The label strip LS is severed at each perforation P in synchronism with the rotation of the label applying roller 49 by a reciprocating knife 69 held in any convenient manner to a reciprocating knife support 71e, the knife 69 cooperating with the fixed knife 66 to sever the label strip LS into discrete labels L.

The precise details of the address labeling head 41 are now well known in the art and a form thereof is shown in the aforesaid Ridenour Patent 2,606,681, except that the type of labeling head shown herein is of the cross feed type. For purposes of disclosure herein the address applying head 41 is illustrated and described somewhat schematically and it includes a shaft 71a having a pair of eccentrics 71b fast therein, see also FIG. 19a, turning within eccentric followers 71c pivotally connected at 71d to a support 71e for the knife 69. Knife support 71e reciprocates as shown in FIG. 19 in a guide 71f and knife 69 thereby severs the label L from the strip LS which has been advanced over fixed knife 66 by pin roller 61.

The shaft 71a is mounted in bearings 72a and 72b supported in any convenient manner on the frame 48. Shaft 71a is driven by a gear 72c fast on a shaft 72d which makes one revolution for every revolution of shaft 68 turning label applying roller 49. Gear 72c meshes with a gear 72e idly supported on shaft 71a and having a clutching pin 72f contacting a clutching pin 72g of an axially movable clutch member 72h fast on shaft 71a by means of a key 72k.

Clutch member 72h is biased to the right by a spring 73a having one end abutting a collar 73b secured to shaft 71a. The clutch member 72h is shifted to the left to disengage the driving connection to shaft 71a by a shifter yoke 73c engaging an annular groove 73d in clutch member 72k and pivoted at 73e. Shifter yoke 73c is pivotally connected at 73f to an armature 74a of a label throwout solenoid 74b, see also FIG. 25.

Label throwout solenoid 74b is under the control of a switch 74c, see also FIG. 25, which is operated by a cam 75a fast on shaft 71a. Switch 74c is part of circuitry which detects a gap in the feeding of a book B by the feeder 40, and which controls the address label head 41 when bulk imprinting only is desired.

The shaft 71a also operates a Geneva mechanism, not shown, which provides the intermittent motion of the shaft 61a driving the pin roller 61. When the solenoid 74b is energized it will be seen that the shaft 61a will not be driven and that the label strip LS will no longer be fed.

The label L is held to the raised pad 67 by suction openings, not shown, in the surface thereof. The suction at such openings is under the control of a valve 71 connected by a pipe 70 to the motor operated vacuum pump 36, see FIG. 1.

As the label applying roller 49 rotates in the direction indicated, the raised pad 67 together with the label L held thereto moves past a glue applying roller 72 turning on a shaft 73. The glue applying roller 72 turns in a glue reservoir 74 and the film of glue on the periphery of the roller 69 is regulated in thickness by means of a doctor blade 75.

The circumferential speed of the glue applying roller 72 is the same as the peripheral speed of the raised pad 67 on the label applying roller 49, and it will be seen that as the label L moves into contact with the book B, as seen in FIGS. 18, it will be held by the glue film to the book B, the suction at the openings in the pad 67 being released by the valve 71.

Structure is provided for sensing a separation mark SM on the label strip LS, such sensing structure being in the form of a light source 76 arranged to focus a beam of light 77 on to the separation mark SM, the beam being reflected therefrom into a photo-electric cell 78.

The separation mark SM marks the start of a new group of subscribers, wherein the books B going to such group are identified by a dealer's name which is different from the group preceding. Such separation mark SM controls the cycling of the imprinter mechanism 43 so that the proper plate holder 45 and impression plate 45a are in position to place a dealer's imprint on the books B of the new group. Details of the cycling of the imprinter mechanism 43 and the control of such cycling will be described in more detail as the specification proceeds.

The light source 76 and photo-electric cell 78 are supported in any convenient manner on a guide 79 for the label strip LS. Alternately, the light source 76 and the photo-electric cell 78 may be such as to measure the difference in opacity of the label strip LS at the separation mark SM, and in such case the light source 76 is arranged to transmit the beam 77 through the strip LS, the transmitted beam 77 being picked up by the photo-electric cell 78 which in such case is disposed beneath the guide 79, it in such case being made of translucent material such as glass or plastic.

In the usual case, the movement of the books B past the photo-electric cell counting device 39 seen in FIG. 1, and the movement of the label strip LS past the sensing device 76 and 78, at those portions of the label strip LS where there is no separation mark SM, will cause the pin wheel 61 to rotate in step-by-step fashion and feed the label L to the label applying roller 49 for application thereby of a pasted and severed label to the moving book B. However, and as has been described, a number of the books within a group are considered bulk mail to be distributed from a dealer's showroom or the like, and such bulk mail does not have the label L applied thereto.

During such imprinting of the bulk mail, the labels L are not applied to the individual books B, and during this period of operation the label strip LS is no longer fed to the address labeling head 41. As has been described, the pin roller 61 does not advance the label strip LS until the bulk count has been imprinted, at which time the address labeling head 41 commences to operate once again. Details of the mechanism and circuits for effecting such operation of the labeling head will be described in more detail as this specification proceeds.

*Details of Indicia Printing Mechanism*

Referring now to FIGS. 21 and 22 of the drawings, the indicia printing mechanism 42 is driven in timed relationship with the address labeling head 41. In general, the indicia printing mechanism 42 comprises a frame 81 affording a support for an indicia printing roller 82 having the periphery thereof engraved with an official notice indicating that the postage had been paid on the book B and also indicating the city from which it had been mailed. The frame 81 also supports an ink reservoir 83 having a doctor roller 84 turning therein, the doctor roller contacting an ink transfer roller 86 for transferring a film of ink to the periphery of the indicia printing roller 82. The ink reservoir 83 is held to the frame 81 by a plurality of spacer dowels 85 and screws 90.

The frame 81 is adjusted with reference to the frame 48 of the address label applying head 41 by means of an angle 87 held by bolts 88 to the frame member 48, and by means of an angle member 89 held to the frame member 81 by cap screws 91. The angles 87 and 89 have respective confronting flanges 92 and 93, each of which is routed to receive a feather 94 affording a slide guide for the flanges 92 and 93 while they are moved relative to each other. The flange 92 has a pair of slots 96 milled therein, and the flanges 92 and 93 can be locked in position by means of a through bolt 97.

Vertical adjustment of the frame 81 with respect to the frame 48 is provided by routing confronting slots 98 in the frame member 81 and in a leg 99 of the angle 89. A feather 100 in the slots 99 guides a frame 81 and angle leg 99. Slots 101 are provided in leg 99 through which the cap screws 91 extend for holding angle 89 to frame 81.

As was described with reference to the address labeling head 41, it is enabled to pivot about the drive shaft 50, and the position of the label applying roller 49 can be adjusted according to the thickness of book B by the adjusting means 57, which comprises a clamping yoke 102 held to the frame by cap screws 103. A socket head screw 104 threaded into the yoke 102 has its lower end bearing against a rest 106 extending across the conveyor table 38 and spaced thereabove. The screw 104 is locked in the yoke 102 by means of a set screw 107.

It will be seen that both the position of the frame 48 and the frame 81 of the indicia printer 42 can be adjusted with respect to the conveyor table 38 in accordance with the thickness of a book B moving across the conveyor table 38 by the conveyor 44.

Structure is provided for driving the indicia roller 82 in timed relationship with the label applying roller 49 which is shown in phantom outline in FIG. 22, so as to apply the postal indicia to a book B which has had an address label applied thereto. To this end the shaft 68 turning with the label applying roller 49 has a sprocket 105 fast thereto. A sprocket chain 108 is trained between sprocket 105 and a sprocket 109 fast on a shaft 110 supporting the doctor roller 84. Adjustment of the slack in the sprocket chain 108 is provided by an idler sprocket 111 mounted at the end of a slack take up arm 112 having a split hub 113 clamped by a bolt 114 to a support 116 for the shaft 110. Support 116 is held to the frame 81 by a flange 117 and cap screws 118. The shaft 110 supporting the doctor roller 84 is supported in side walls 119 and 121 of the reservoir 83.

A driving train is provided for driving the indicia applying roller 82 from the shaft 110 and to this end a sprocket 122 is fast upon the shaft 110, there being a sprocket chain 123 trained about the sprocket 122, an idler sprocket 124, a sprocket 126 fast on a shaft 127 supporting the roller 82, and an adjustable idler sprocket 128 mounted on an idler shaft 129 extending from the frame 81 and adjusted in position with respect thereto by any convenient means. The idler sprocket 124 turns upon a stub shaft 131 extending from a frame 81, it having one end thereof threaded as shown and held to the frame 81 by securing nut 132.

Driving structure is provided for the doctor roller 84 and the ink transfer roller 86, and comprises a driving gear 133 fast on the shaft 110 supporting the doctor roller 84, and meshing with a gear 134 fast on a shaft 136 journalled in the side walls 119 and 121 of the ink reservoir 83.

A doctor blade 137 for adjusting the thickness of the film of ink on the doctor roller 84 is held to an end wall 138 of the ink reservoir 83 by means of cap screws 139.

Mechanism is provided for moving the indicia roller 82 out of contact with the transfer roller 86 when the label head 41 is inoperative during the imprinting of bulk mail. At such times the label applying roller 49, while it still revolves does not have the individual severed labels L applied to the periphery thereof, and as has been explained, such bulk books do not have the postal indicia applied thereto. Structure is accordingly provided for moving the indicia applying roller 82 to a position where it will not contact a book B. Such structure comprises a fork 140 having spaced arms 141 which extend from a hub 142 having a hollow eccentric 143 therein which is adjusted with respect to shaft 131 by means of a locking collar 144 and set screw 146. The angular position of the eccentric 143 with respect to the shaft 131 determines the position of the centers of the shaft 127 and its contact with the ink transfer roller 86.

Structure is provided for adjusting the position of the transfer roller 86 with respect to the doctor roller 84 so as to insure a uniform thickness of ink being applied to the transfer roller 86. The shaft 136 supporting the transfer roller 86 is provided at each end with eccentric bushings 147 which extend into openings 148 in the side walls 119 and 121 of the ink reservoir 83. The bushings 147 are also supported in arms 149 which extend along the outside of the side walls 119 and 121. The eccentrics are fixed in the arms 149 and are individually adjusted in their angular position with respect to the arms 149 by means of set screws 151 and 152. The arms 149 are joined by a pintle 153 threaded at its ends and having a securing nut 154 at each end thereof. The pintle 153 is tapped to receive an adjusting screw 156 bearing against the upper edge of the side wall 119.

The roller 86 supported at the ends of the arms 149 is urged against the doctor roller 84 by means of a spring 157 anchored at 158 to one of the arms 149 and anchored at its other end at 159 to the outside of the side wall 119. The pressure between the transfer roller 86 and the doctor roller 84 can be adjusted by the adjusting screw 156, and during periods of non-use the transfer roller 86 is lifted out of contact with the doctor roller 84 by inserting a block or wedge between the adjusting screw 156 and the top of the side wall 119, so as not to form a flat in the transfer roller 86 which is ordinarily made of rubber.

The inner faces of the side walls 119 and 121 are provided with a resilient wiper 161 which wipes each end of the rollers 84 and 86, each such wiper being mounted on a bracket 162 secured in any convenient fashion to the inside faces of the side walls 119 and 121.

Structure is provided for adjusting the amount of pressure between the indicia applying roller 82 and the transfer roller 86, and to this end one of the arms 141 has a boss 163 extending therefrom, boss 163 being tapped to receive an adjusting screw 164 which bottoms against an abutment 166 extending from the frame 81.

The indica printer roller 82 is adapted to be swung to a position out of contact with the books B when address labels and indicia P.I. are not to be applied thereto, and the indicia roller 82 is adapted to be moved to such position by means of a solenoid 167 mounted on the frame 81. Solenoid 167 is controlled in its operation by circuits best seen in FIGS. 25 and 26 and later to be described. When the solenoid 167 is energized, it moves an armature 168 thereof upward, see FIG. 21. The armature 168 is connected by links 169 and 171 to a pin 170 extending from a bell crank 172 supported on a shaft 173 supported in the side frame 81. An operated lever 174 is fixed to the shaft 173 and has a pin 176 extending therefrom engageable with a slot 177 formed in one of the arms 141.

When the solenoid 167 is energized, the bell crank 172 will rock in a counter clockwise direction, the pin 176 engaged in the slot 177 rocking the arms 141 in a counter clockwise direction to move the indicia applying roller 82 out of contact with the books B.

*Details of Imprinter Mechanism*

Figure 8:
FIG. 8 is a sectional view, certain parts being shown in plan, taken along line 8—8 of FIG. 4 and looking in the direction of the arrows.
Figure 15:
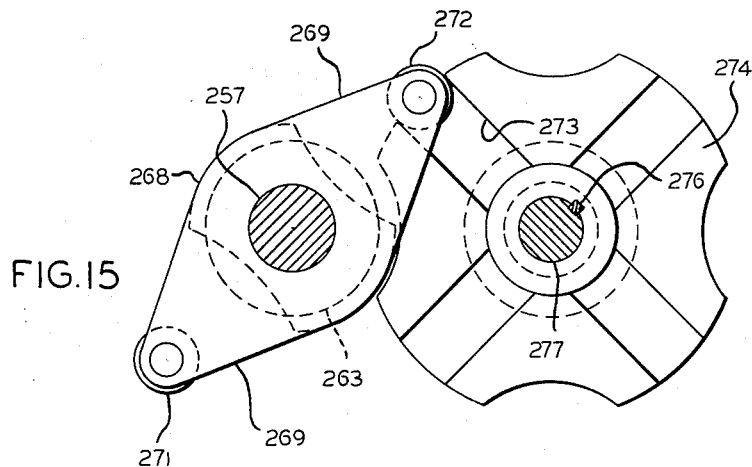
FIG. 15 is a view looking in the direction of the arrows 15—15 of FIG. 9 showing details of a Geneva mechanism forming part of the plate change mechanism.
Figure 16:
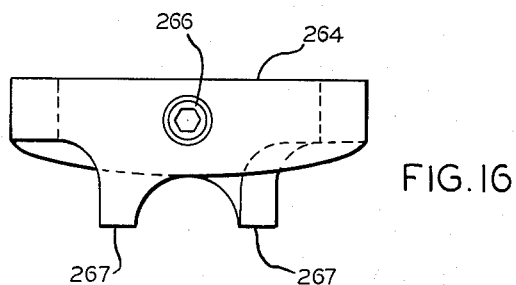
FIG. 16 is an enlarged elevational view showing details of a cam forming part of the Geneva plate change mechanism seen in FIG. 15.

Referring now to FIGS. 4, 7 to 17, 23 and 24 of the drawings, the imprinter mechanism 43 includes a pair of laterally spaced frame members 182 and 183 which are arranged to pivot together about a dead shaft 184, see also FIG. 8, supported in brackets 186 and 187 secured to the table 38 in any convenient manner. The brackets 186 and 187 are arranged to flank the book B as it moves longitudinally of the conveyor table 38 by the conveyor lugs 46.

The upper parts of the two frames 182 and 183 have a table 188 extending therebetween and supporting a stack of the plate holders 45 seen in FIGS. 5 and 6. The frame members 182 and 183 are adapted to be pivoted about the dead shaft 184 by an adjusting device consisting of a U-shaped standard 189 arranged to straddle the books B, the spaced legs of the U-shaped standard being each retained in sockets 191 held to the table 38 by cap screws 192. The bight 193 of the U-shaped standard 192 has an internally threaded sleeve 194 into which is threaded an adjusting member 196 having wing arms 197, the upper end of the adjusting member 196 being received in a socket 195 in the table 188. It will be seen that the frame members can be rocked about dead shaft 184 by means of the adjusting member 196.

The frames 182 and 183 of the imprinter mechanism 43 support a transfer cylinder 198 adapted to remove the bottommost plate holder 45 of the stack seen in FIG. 4, and transfer same to an imprinter cylinder 199. The imprinter cylinder 199 is supported on a shaft 201 journalled at a bearing 202 supported on the frame 183 and at a bearing 203, see also FIG. 7. As seen in FIG. 8, shaft 201 extends through an opening 205 in the frame 183.

The imprinter cylinder 199 is fast with a hub 204 of a gear 206 which receives it driving effort from a gear 207 supported on a hollow driving shaft 208 having a bearing 209 at one end thereof and a bearing 211 at the other end thereof, both of said bearings being in turn supported on the dead shaft 184. The driving shaft 208 has a main drive sprocket 212 fast thereon which is driven by the main driving motor 34 seen in FIG. 1, so that the imprinter mechanism 43 is driven in timed relationship with the labeling head 41 and the indicia printing mechanism 42 previously described.

In order to adjust the position of the imprinter cylinder 199, so that the plate holder 45 and the impression plate 45a supported thereby will imprint the book B at a proper position thereon, the gear 207 is adjustable in its angular position with respect to the hollow driving shaft 208. The gear 207 has an internally threaded hub 213 which is supported on a clutching ring 214 held to the driving shaft 208 by a pin 216. A locking wheel 217 is mounted on the driving shaft 208 and has an externally threaded hub 218 which threads into the hub 213 of the gear 207. Hub 218 and clutching ring 214 have mating conical faces 219, so that when the locking wheel 217 is threaded into the hub 213, gear 207 will be locked in position on the driving shaft 208. By the arrangement just described, it is possible to adjust the register of the imprinting roller 199 with the book B.

The plate holder 45 supported by the imprinter roller 199 is adapted to receive a film of ink from fountain rollers 221 and 222 adapted to turn in a reservoir defined by side walls 223 and 224, and end walls 220 and 225. Roller 221 is supported at one end in a removable bearing 226 and at its other end in a removable bearing 227, and fountain roller 222 is arranged to be detachably supported upon similar such bearings, not shown.

Rollers 221 and 222 are driven respectively by meshing gears 228 and 229, gear 228 meshing with a gear 231 supported on a bushing 232 in turn supported on the shaft 201. Driving effort is transmitted from the roller 199 to the gears 228 and 229 by means of a one way spring type clutch 233 which is wrapped about a hub 234 supporting one end of the roller 199, and also wrapped about a hub 236 of the gear 231.

It will be seen that when the imprinting cylinder 199 is driven by the driving sprocket 212 the fountain rollers 221 and 222 will likewise be driven so as to spread a film of ink over the impression plate 45a.

However, during periods when the imprinting mechanism 43 is not being operated, as would be indicated when the machine seen in FIGS. 1 and 2 is used for an addressing operation only, it is desirable to maintain the driving contact between the fountain rollers 221 and 222 so that flat spots will not be formed on their surfaces. It may be noted that one or the other of the fountain rollers 221 and 222 may be formed of material with a photoengraved surface, while the other surface is made of rubber or other elastic material.

To this end, see particularly FIGS. 11 to 13, the shaft 201 has a bushing 237 supporting a sprocket 238 connected by a driving chain 239 to a driving sprocket 241 fast on a driving shaft 242 of a small continuously operated motor 243, see also FIG. 25. The sprocket 238 has a hub 244 affording a support for one end of a one way spring type clutch 246 having its other end supported on the hub 236 of the gear 231. It should be noted that the clutches 246 and 233 are of opposite sense so that when clutch 233 is operating, clutch 246 is slipping and vice versa.

Mechanism is provided for transferring the bottommost plate holder 45 of the stack of plates supported on the shelf 188 seen in FIG. 4, to the transfer cylinder 198 and supporting the same on the transfer cylinder 198, and subsequently transferring the plate holder 45 from the transfer cylinder 198 to the imprinter cylinder 199. Such placing of a different plate holder 45 on the imprinter cylinder 199 is concomitant with the removal of plate holder 45 from the imprinter cylinder 199. It is possible, however, to effect the substitution of the plate holder 45 without shutting down the operation of the labeling head 41 or the indicia printer 42 and without having any break in the feeding of the books B. As has been previously described, the signaling of a change in the dealer and the plate holder 45 is caused by the separation mark SM seen in FIG. 20 of the label strip LS moving past the beam of light from the light source 76 and the photoelectric cell 78 seen in FIG. 19 to initiate one or more circuits seen in FIGS. 25 to 27.

Reference will be had to such circuits as this specification proceeds, but it should be noted that upon energization of such circuits the transfer cylinder 198 is caused to cycle through one revolution to effect a plate change. Mechanism for effecting such plate change includes a plate change housing 247, see also FIGS. 4, 7 and 9, secured to the frame 183 of the imprinter mechanism 43. The housing 247 has a support 248 therein to journal the shaft 201 which turns in the bearing 203 held in the support 248. The housing 247 also has a wall 251 extending therefrom affording a support 252 for a bearing 253 for the shaft 201. That portion of the shaft 201 extending within the housing 247 has a worm 254 fast thereon which meshes with a worm wheel 256 freely turning on a vertical dead shaft 257 supported at its lower end in a support 258. The worm wheel 256 has a hub 259 extending upward therefrom formed with clutch dogs 261 in the upper end thereof. These clutch dogs normally are out of mesh with mating clutch dogs 262 formed on the end of a hub 263 which is also guided by the vertical dead shaft 257.

Figure 17:
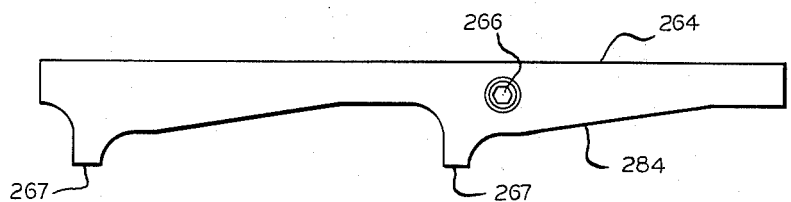
FIG. 17 is a developed view of the cam seen in FIGS. 9 and 16.

A circular cam 264 is held to the hub 263 by means of a socket head screw 266, and the cam 264 has a pair of 180° apart stops 267, the cam 264 being shown in its developed form in FIG. 17.

The hub 263 also supports a Geneva crank 268 having arms 269, each of which is provided with a roller 272. Arms 269 of the Geneva crank are adapted to enter 90° apart slots 273 of a Geneva wheel 274 held by a key 276 to a shaft 277.

The hub 263 together with its cam 264 and the Geneva crank 268 are biased downward by means of a spring 278 surrounding the dead shaft 257 and held between the support 279 for the upper end of the shaft 257 and the Geneva crank 268.

The clutch dogs 261 and 262 are normally kept in the disengaged position seen in FIG. 10 by means of a solenoid 281, see also FIG. 25, held to the outside of the housing 247 and having an armature 282. The armature 282 of the solenoid 281 has a roller 283 at the end thereof which engages the camming surface 284 of the cam 264, so that when the solenoid 281 is energized the roller 283 can move out of contact with the surface 284, the spring 278 causing the clutching dogs 261 and 262 to come together. Since the shaft 201 supporting the imprinting roller 199 is rotating the worm 254 thereon will drive the wheel 256 and in turn the Geneva crank 268.

The shaft 277 is journalled at its lower end in a bearing 286 held in a support 287 extending from a wall 288 of the housing 247. The upper end of the shaft 277 is journalled in a bearing 289 supported in a top wall 291 of the housing 247. The shaft 277 has a bevel gear 292 fast thereon which meshes with a bevel gear 293 fast upon a shaft 294 supporting the transfer cylinder 198. The shaft 294 turns in a bearing 296 supported in the wall 288 in the plate change housing 247, and the other end of the shaft 294 is journalled in a bearing 297 held in an annular bearing support 298 mounted on the frame 182.

As seen particularly in FIG. 7, the plate transfer cylinder 198 comprises a pair of circular end plates 299 and 301 adapted to support the edges of the plate holder 45.

Intermediate circular plates 302 of somewhat smaller diameter than the diameter of the end circular plates 299 and 301 provide clearance for the impression plates 45a mounted on the plate holder 45.

The annular plates 299, 301 and 302 are notched as at 303 to receive a magnetic pick off bar 304, see also FIGS. 4 and 23, having spaced fingers 306 extending therefrom, see FIG. 7, which are adapted to enter corresponding openings 307 in the plate holder 45, see FIG. 5. The fingers 306 move into contact with stiffener members 308 which are spot welded to the leading edge of the plate holder 45. The pick off member 306 is made of a high retentivity magnetic material such as Alnico or the like, and the stiffener members 308 are made of paramagnetic material so that the stiffener members 308 will firmly adhere to the pick off bar 304.

Referring now to FIG. 23, the plate holders 45 are arranged in a stack as shown, see also FIG. 4, and are guided along their sides between side guides 309 mounted on brackets 310 extending upward from the support table 188. The plate holders 45 are also guided along their forward edges by means of a front guide 312 secured to the side guides 309. Guides 311 for the plate holders 45 extend upward from the support table 188.

The cycling of the Geneva mechanism seen in FIGS. 7, 9, 10, 15 and 16, occurs upon energization of the solenoid 281, and causes the transfer cylinder 198 to turn through one complete revolution to pick off the bottommost plate holder 45 from the stack seen in FIG. 4, and move same to the imprinting cylinder 199. The Geneva crank and follower mechanism seen in FIG. 15 causes the transfer cylinder 198 to accelerate to a speed corresponding to the peripheral speed of the imprinting cylinder 199 at 180° displacement of cylinder 198 from the position seen in FIG. 4. From 180° displacement of the transfer cylinder 198 to 360° of displacement thereof, it decelerates from maximum speed to rest, once more to resume the position seen in FIGS. 4 and 23.

Structure is provided on the imprinting cylinder 199 for effecting transfer of the plate holder 45 from the transfer cylinder 198 to the printing cylinder 199, and to this end the imprinting cylinder 199 is provided with a magnetic pick off bar 313 similar in shape to the pick off bar 304, and having raised portions 314 thereon adapted to interdigitate with the raised portions 306 on the pick off bar 304 at the opening 307 in the plate holder 45. Like the pick off bar 304, the pick off bar 313 is made of a high retentivity magnetic material such as Alnico.

Such transfer of the plate holder 45 from the transfer cylinder 198 to the imprint cylinder 199 takes place substantially near a line connecting the centers of the shaft 294 for the transfer cylinder 198 and of the shaft 201 for the imprinter cylinder 199. Since at that time the lugs 306 will be moving away from the line connecting such cylinder, and since the speed of rotation of the imprinting cylinder is slightly faster than the speed of the transfer cylinder 198 just after such instant, the lugs 314 on the bar 313 will engage the stiffener members 308 of the plate holder 45.

When the transfer of the plate holder 45 to the imprinter cylinder has been completed, the trailing end of the plate holder 45 is held magnetically by a magnetic holder bar 315, see FIGS. 4, 7 and 13, which attracts a plate stiffener 320 on plate holder 45, see FIG. 5.

The plate holders 45 are stacked as seen in FIG. 4, with the impressions 45a thereon face down, and after the transfer is effected from the transfer cylinder 198 to the imprinter cylinder 199 the impression 45a is on the outside of the cylinder 199, in position to cooperate with the ink transfer roller 221.

Structure is provided for guiding the plate holder 45 as it moves with the transfer cylinder 198, and to this end hold down fingers 316 are held by a member 317 extending between the side brackets 310.

Mechanism is provided for effecting separation of the plate holders 45 so that the bottommost one thereof is separate and distinct from others lying atop thereof, and to this end a separating finger 318 is guided on a pin 319 extending from the front guide 312, see particularly FIGS. 23 and 24. A rocking lever 321 is arranged to rock about a pin 322 extending from a support block 323 held by cap screws 324 to the front guide 312. The rocking lever 321 has an extension 326 therefrom bearing against the separating finger 318 and normally in contact with the front guide 312 as seen in FIG. 23. A spring 327 is guided by the pin 319 and has one end bearing against the separating finger 318, the other end bearing against a stop flange 328 on the pin 319. An actuating pin 329 extends from the side plate 299 of the transfer cylinder 198, and when the transfer cylinder rotates in the clockwise fashion seen in FIG. 23, it strikes a finger 331 secured to the rocking lever 321, the rocking lever 321 being rocked in a counter clockwise direction, and the separating finger 318 being moved against the bias of the spring 327 along the pin 319. When the lugs 306 on the magnetic bar 304 engage the reinforcing strips 308 on the leading edge of the plate holder 45, the bottommost plate holder 45 is thus separated from the one lying atop thereof. As the transfer cylinder 198 rotates in a clockwise direction and the finger 331 moves out of contact with the pin 319 the bias of the spring 327 moves the separating finger 318 once more to the left to separate the bottommost plate holder 45 of the stack from those lying atop thereof. Structure as seen in FIGS. 23 and 24 is mounted on each end of the front guide 312 so that the separation is effected at both sides of the plate holder 45.

Once the solenoid 281 seen in FIG. 9 is energized and the clutch members 261 and 262 move into engagement, seen in FIGS. 9 and 10, the cycling of the transfer cylinder 198 is complete, it moving through a full revolution. Upon de-energization of the solenoid 281 the roller mounted on the armature 282 thereof once more comes into contact with the cam surface 284 on the clutch member 263 until the roller 283 comes into contact with the stop on the cam surface 267 to prevent further rotation of the transfer cylinder 198. At such time the clutch dogs 261 and 262 seen in FIG. 10 are disengaged.

It should be borne in mind that the imprinting cylinder 199 operates continuously. The transfer of the plate holder 45 from the transfer cylinder 198 to the imprinting cylinder 199 is effected at the same time the previously used plate holder 45 is stripped from the printing cylinder 199. Structure is accordingly provided which will strip a plate holder 45 from the imprinting cylinder 199 while a new plate holder 45 is placed thereon. As seen particularly in FIGS. 4, 7, 11 and 13, such structure comprises a plurality of stripper fingers 332 adapted to enter annular grooves 333 on the imprint cylinder 199. The stripper fingers 332 are fast on a hollow shaft 334 supported at each end in bearings 336 in turn mounted on a dead shaft 337 having its ends supported in the frame members 182 and 183, see FIG. 7.

Structure is provided for rocking the hollow shaft 334 together with the stripper fingers 332 mounted thereon, and to this end the hollow shaft 334 is provided with a cam follower arm 338 having a roller follower 339 extending therefrom and in contact with the stripper cam 341 fast on the shaft 294 supporting the transfer cylinder 198, see also FIGS. 11 and 13.

The contour of the cam 341 and its angular displacement once the cycling has been initiated by the Geneva mechanism described with reference to FIGS. 9, 10, 15, 16 and 17, causes the stripper fingers 332 to enter the slots 333 on the imprinter cylinder 199 and strip the plate holder 45 therefrom. The holding force created by the magnet bar 315 on the imprinter cylinder 199 and the reinforcing 320 at the trailing end of the plate holder 45 thereby causes the plate holder 45 to be stripped from the imprinter cylinder 199 and to be propelled into a plate hopper 342, see also FIG. 4.

Structure is provided for insuring that the imprinter cylinder 199 and the transfer cylinder 198 are in proper register at the time of transfer of the plate holder 45 from the transfer cylinder 198 to the imprinter cylinder 199. As seen in FIG. 14, the circular end disk 299 of the transfer cylinder 198 is provided with aligning fingers 343, 344 and 346 which extend from and are integral with an aligning member 347 secured to the circular disk 299 by means of socket head screws 348. The fingers 343, 344 and 346 interdigitate with fingers 349, 350 and 351 of aligning plate 352 held to the left end of the imprinter cylinder 199 by socket head screws 354, as seen in FIG. 7. The interdigitating fingers serve to register the transfer cylinder 198 and the imprinting cylinder 199 properly so that the plate holder 45 is transferred from the pick off member 306 on the transfer cylinder 199 to the magnetic bar 314 of the imprinter cylinder 199.

*Description of Bulk Mail Counting Mechanism*

Referring now particularly to FIGS. 4 and 5 and 26 of the drawings, the number of copies which has heretofore been described as bulk mail and which is to have the dealer's name only applied thereto is determined by a scanning mechanism which scans the plate holder 45 as it moves past a plurality of light source and photoelectric cells which places a count of such bulk mail into a counter.

Referring particularly to FIG. 4, the side frames 182 and 183 have arms 356 extending therefrom, the arms 356 being spanned by a support 357 for a plurality of light sources 358 each of which is designated with an appropriate subscript according to whether it is for measuring a count of units, tens, hundreds or thousands. Each light source 358 is in register with a tier of slots 359 in the plate holder 45, each such tier of slots having nine equally spaced pulsing slots 361 therein. The tiers and slots are likewise designated with appropriate subscripts according to the units, tens, hundreds and thousands of count. The rays of light from each light source 358 are adapted to impinge upon photo-cells 362, each photo-cell delivering a pulse of energy to an associated amplifier and shaper 363, see FIG. 26.

The photo-cells are each supported on an angle 364 held at each end by bolts 366 to a bracket 367 extending between the frame members 182 and 193 as seen particularly in FIG. 4.

The tiers 359, each with the nine slots 361 therein, are part of a decade counting system for counting units, tens, hundreds and thousands of the count of bulk mail. The counting of the bulk mail is achieved by the plate holder 45 moving between the light sources 358 and the photo-cell 362 and past the counting openings 361 of each tier 359. The count registered by the movement of the plate holder 45 past the photo-cell 362 is placed in an electronic counter unit 370 having a unit decade $368_1$, a tens decade $368_{10}$, a hundreds decade $368_{100}$, and a thousands decade $368_{1000}$.

However, and for reasons as will appear, the count impressed in the electronic counter 370 is the complement of the actual count of such bulk mail and ten thousand. That is to say, if 766 copies of bulk mail are to be imprinted, the electronic counter will have a count of 9,234 impressed thereon. In such case, all but four of the openings $361_1$ of the units tiers $359_1$ will be masked off, all but three of the openings $361_{10}$ of the tens tier $359_{10}$, all but two of the openings $361_{100}$ of the hundredths tier $359_{100}$, and none of the openings $361_{1000}$ of the thousands tier $359_{1000}$.

The precise form of the counter 370 forms no part of the present invention and any suitable counting device may be employed. However, it is of the type which will receive a pulse to add a unit count thereto, where such pulse is from another source as from the count of the books moving past the photo-electric counter 39, seen in FIG. 1, so as to increase the count therein unit by unit until the counter 370 attains a count of 10,000.

*Details of Control Circuits*

Referring now to FIGS. 25, 26 and 27 of the drawings, the address labeling and imprinting machine according to the present invention includes a control circuit as seen in FIG. 25 including a pair of power leads 401 and 402 which may be connected to a 110 v. A.C. source. A main switch 403 is connected across the leads 401 and 402. Line 401 is normally connected at all times to various circuit elements to be described requiring a normal warm up period. Line 401 which is common to all such elements is indicated at each such element by the same reference numeral 401. The supply line 402 has a main control switch 404 connected therein.

The switch 404 is moved from position I to position II to close a circuit to stand by powered elements of the circuit seen in FIG. 25, the switch 404 being subsequently movable to a position III to maintain the power through the lead 402 there being a lead 409 connecting a blade 411 of the switch to the power source 402. All such stand by powered devices are shown with power leads 401 and 402 thereat. In position III of switch 404 circuits controlled by the stand by powered devices include a pair of control leads 406 and 407 connected through a blade 408 of switch 404.

The addressing head 41, the indicia printer 42 and the imprinter 43 are under the control of the four pole double throw switch 420 which is movable to an "imprint and address" position shown for the conjoint operation of the address applying head 41, the indicia printer 42 and the imprinter mechanism 43. In the "open" position of the switch 420, the addressing head 41 only is operated, while in the position marked "imprint only," the label head 41 and the indicia printer 42 are rendered inoperative while the imprinter 43 alone is operated. For purposes of description at this point, the switch 420 will be considered as being in the "imprint and address" position.

Considering the machine 30 as starting from rest, the main drive unit 34 is first energized and the imprinter cylinder 199 of the plate changing mechanism 43 is also driven thereby. The plate changing mechanism 43 is thereupon operated through a plate changing cycle to place a plate holder 45 on the imprint cylinder 199. In order to effect such plate changing cycle a manual plate change switch 425 is closed, it closing a circuit comprising power lead 402, a coil 428 of plate change solenoid 281, see FIG. 9, leads 426 and 427 and power lead 401.

At this plate changing operation the counter 370 seen in FIG. 26 is actuated to impress a complement count thereon by movement of the plate holder 45 past the light sources 358, as has previously been described.

During the rotation of the transfer cylinder 198 seen in FIG. 7, in effecting a plate change, a switch actuator 429 supported on the shaft 294 of the transfer cylinder 198 closes a normally open limit switch 431 supported on the frame 182 of the imprinter mechanism 43. The switch 431 has a contact 432 which is closed by the actuator 429 and the contact 432 is connected in series with a coil 434 of a relay 436 which forms part of circuitry for controlling the address label applying head 41 seen in FIGS. 1, 2, 18 and 19.

Relay winding 436 is connected in series with contact 437 on counter 370, contact 437 being closed when counter 370 has a count impressed thereon by movement of plate holder 45 past the light sources 358 and photo-cells 362, see FIG. 26. It should be noted that contact 437 opens when the electronic counter 370 reaches a count of ten thousand, the same as zero count thereon. At all other times contact 437 is closed.

When relay winding 436 is thus energized, it also closes contacts 440 and 441 connected in a circuit which includes the power lead 402, switch 420, a lead 422, contacts 440 and 441, a lead 443, the switch 420, and a lead 444, the circuit being completed through a contact 446 operated by the cam 75a seen in FIG. 19a, which is part of the addressing mechanism 41 seen in FIGS. 18 and 19. The cam 75a is rotated by the addressing head 41 to close the same and thereby energize the label throw out solenoid 74a, the circuit being completed therethrough by the lead 401.

The energization of relay 436 also closes a holding contact 439 connected in parallel with the contact 431 to maintain the coil 434 of relay 436 in energized condition.

During this period when the addressing head 41 is not operating, the imprinter 43 is operable to imprint the dealer's name on the books B.

As the book B moves along the conveyor table 38 past the photo-electric counting mechanism 39 which includes a light source 39a and a photo-electric cell 39b seen in FIGS. 1 and 26, the movement of each book past the photo-electric counting mechanism 39 causes a pulse to be given to the counter 370 seen in FIG. 26, until it reaches a total count of 10,000 or zero, subsequent books starting a new count on the counter 370 which is cleared prior to a subsequent plate changing cycle. The movement of the books B past the counting mechanism 39 closes a circuit through a relay 412 connected to the output of an amplifier 413 which is pulsed by the photo-electric cell 39b. Each time relay 412 is energized contacts 414 and 416 are closed to complete a circuit through a total counter 417.

When each book B has moved past the light source 39a and the relay 412 is de-energized, contact 414 thereof closes upon a contact 419 connected in a lead 421 thereof, connected to lead 444 and thence to switch 75a which is now closed, the label throwout solenoid 74b remaining energized.

Each time amplifier 413 is pulsed by the movement of the book, a counting pulse is given to the counter 370 by a lead 418 connected between amplifier 413 and counter 370.

Assuming that the decade counter 370 seen in FIG. 26 has reached a count of 10,000, marking the end of the count of bulk mail, the contact 437 of the counter relay 438 of counter 370 opens to de-energize the coil 434 of relay 436 and open contacts 440 and 441 thereby de-energizing the solenoid 74b and re-engaging the address label applying mechanism 41 to feed the label strip LS.

Whenever bulk mail is being imprinted the books B are not applied with postal indicia P.I. seen in FIG. 3, a circuit being provided for controlling the operation of the solenoid 167 seen in FIG. 21 to raise the indicia printer roller 82 out of contact with the book B. This circuit is operable when the address head 41 is disengaged, but since the postal indicia is applied to the book B at a point spaced from the address label head 41, its operation takes place a partial cycle after the addressing head 41, depending upon the spacing therefrom. The circuit for controlling the indicia printer 42 includes a switch 462 which is closed when the cam 75a on the address applying head is closing the switch 446, see FIG. 27. The switch 462 is connected in series with the power lead 402 and a lead 463. The shaft 68 turning the label applying roller 49 has a cam 464 thereon which is displaced angularly from the cam 75a of the label throw out mechanism of the addressing applying mechanism 41, see also FIG. 21.

The angular displacement between the cams 464 and 75a corresponds to the distance between the point of application of the address label L to the book B and the point of application of the postal indicia P.I., to such book, which in the normal case is about fifteen inches. In the usual case, the books B are spaced about twenty inches. The angular displacement is therefore roughly three-fourths of a full cycle and the cams 464 and 75a are therefore displaced approximately 270°.

The cam 464 closes a contact 466 which is connected in series by a lead 467 with a make before break contact 468 of an indicia relay 469. Contact 468 is connected in series with the contact 446 of the label throw out mechanism previously described, and upon closing of the circuit including contacts 446 and 468, a coil 471 of relay 469 is energized. When coil 471 is energized, a circuit is made by a contact 472 connected in series with the solenoid 167 controlling the contact of the indicia roller 82 with the book B, see FIGS. 21 and 22.

Line 463 has a contact 473 in parallel with the contact 468, the contact 473 being arranged to make before the contact 468 breaks, so that the relay 471 will remain in energized condition irrespective of the condition of the contact 468 which is opened by the energized relay 471. The relay 471 is maintained in the energized state by a circuit which now includes the contact 462 instead of contact 446.

The opening of the circuit to the indicia throw out solenoid 167 occurs approximately three-quarters of a book cycle later than the resumption of operation of the labeling head 41.1 As the cam 75a rotates upon resumption of the labeling operation, the contact 462 operated thereby is opened approximately 270° later. Consequently, the resumption of indicia printing occurs only when the book B is in proper position with respect to the indicia printer 42 for such indicia printing.

Upon resumption of address labeling and indicia printing at the conclusion of bulk imprinting the label strip LS is fed intermittently past the light source 76 and photo-cell 78. The addresses on the label strip LS do not affect the photo-cell 78, but upon the occurrence of a separation mark SM, marking a new dealer's imprint, the imprinter mechanism is again cycled and a new count of bulk mail taken from the plate holder 45 as it moves past the light sources 358 and photo-cells 362 seen in FIG. 26.

A circuit is provided for sensing the label strip LS while it is stationary and at a point where the separation mark SM is thereon. At the time of the sensing of the separation mark SM, which marks the occurrence of a new dealer imprint, the books B are still moving along the conveyor 44 for the application thereto of an address label applied by the address label applying head 41. The sensing of the label strip LS is done at a point in advance of where a new dealer's name is to be applied to the books, and there are a number of books in the process of movement on conveyor 44 which have the address labels of the previous group applied thereto. Accordingly, the making of a plate change for the dealer of a new group occurs while the last addresses of the previous group must be processed and applied at the address label applying head 41, the indicia applying head 42 and the imprint mechanism 43.

The movement of the label strip LS to a point where the separation mark SM thereon is sensed by the photo-cell 78, causes an amplifier 476 triggered thereby to energize a relay 477, which closes a contact 478 connected in series with a contact 475 of the relay 412, a lead 479 and a lead 481. Contact 475 is closed by movement of the book past the photo-cell unit 39.

The closed contacts 478 and 475 are part of a circuit through a stepping switch 486 which is arranged as part of a memory circuit storing the count of a number of books of a previous dealer group which are yet to be address labeled and indicia printed before a plate holder 45 of a subsequent group is in imprinting position on imprinter cylinder 199 of the imprinter mechanism 43. The stepping switch 486 is operated by a stepper coil 489 obtaining its energy from a rectifier 491 connected across the power leads 401 and 402. The circuit for energizing the stepper coil 489 includes a lead 402, lead 490 from the rectifier 491, stepper coil 489, control lead 407, switch 408, control lead 406, contact 475, lead 479, switch 420, lead 481, contact 478, and thence to lead 401 at the amplifier 476.

The contact 475 is actuated each time the relay 412 is energized, and each time the stepper coil 489 is de-energized, it moves the armature 492 connected as shown to a wiper arm 493 having a wiper contact 495 at the end thereof, the stepper switch 486 moving the wiper arm 493 one step.

The initial energization and de-energization of the stepper coil 489 moves the wiper arm to station No. 2 shown, and thereafter the stepper arm 493 is moved by the opening and closing of the contact 475, contact 478 no longer controlling. Each time contact 475 closes, a circuit is made which includes a lead 494 connected to the wiper arm 493, lead 405, contact 475 and a lead 496 connected to a common terminal 497 for all the terminal stations Nos. 2 to 25 shown at stepper switch 486, the arm 493 advancing one step during each pulsing of the stepper coil 489.

The wiper arm 493 operates a wiper arm 499 on the second tier of stepper switch 486, the wiper arm 499 of the second bank of the stepper switch 486 being connected to the power lead 402. The second bank of the stepper switch 486 has terminals Nos. 1 through 25, each being discrete and not being connected as are stations Nos. 2 to 25 of the first bank. Wiper arm 499 has a wiper 501 at the end thereof of a type which makes an adjacent terminal before it breaks the contact at the previous terminal.

The terminals Nos. 1 through 25 of the second bank of stepper switch 486 are each connected to corresponding terminals 1 through 25 of a selector switch 502. The selector switch 502 has three banks as shown, the terminal 1 of the first bank being connected as shown to contact 2 of the second bank and successively to contact 3 of the third bank. By way of example, contacts 6, 7 and 8 of banks 1, 2 and 3 are joined in such fashion as are their adjacent contacts. Selector switch 502 has a wiper 503 in each bank, the wipers having a common index. Each step on the second bank of the stepping switch 486 is tied by a typical lead 504 to a contact on the first bank of the selector switch 502.

Sensing of the label strip LS at the separation mark SM is done a number of cycles in advance of the time when the label bearing the separation mark SM is applied to the first book B of a new group. In order to cause cycling of the imprinter mechanism 43 so the plate holder 45 bearing the impression plate 45a of the new group is placed in position, such cycling must be delayed an amount which considers the number of books between the addressing head 41 and the imprinter mechanism 43.

By way of example, if the lable strip LS is sensed fifteen labels before the labeling head 41, if there are two book spaces between the labeling head 41 and the imprinter head, and if it takes five cycles (rotations) of the imprinter roller 199 to effect a plate change thereto, a delay of eight cycles will be needed before a plate changing cycle is initiated on the imprinter 43.

Such delay is by way of example, and others are applicable according to the position of scanning of the tape, distance between the addressing head 41 and imprinter mechanism 43, and the number of cycles required by the last to effect a plate change.

By way of example, then, and for purposes of description at this point, the wiper arm 503 is set at position 8 on the first tier of selector switch 502. At the time that the wiper arm 493 has moved to position 8 by reason of pulsing of stepper coil 489, a circuit will be made through a typical lead 504 connecting point 8 on the second bank on the stepper switch 486 to point 8 on the first tier of the selector switch 502, the wiper arm 503, and a lead 506 connected to a selector relay winding 507 of a selector relay 508 connected to the other side of the line by lead 401.

When selector relay winding 507 is energized a holding circuit is made through the coil 428 of the plate changing solenoid 281 including a contact 509, a lead 511, the coil 428 and the opposite supply lead 402.

It will be seen that the holding circuit including the selector switch 502 and the stepper switch 486 are designed to maintain a plate changing operation for three normal cycles of operation. That is to say, the cycling is maintained for a period long enough for three books to pass the light source 39a. The duration of this cycle is long enough to initiate a plate changing cycle and at the same time to insure that the counter 370 seen in FIG. 26 is reset to zero. It will be remembered that the movement of the books past the light source 39a is such as to initiate a count in excess of 10,000, representing those books of a group which are to be addressed. The count of such books must not be introduced into the counter 370 which would add to the count impressed by the plate holder 45 as it moves past the photo-cell and light source 358 and 362 respectively, mounted on the imprinter mechanism 43.

The maintaining of the circuit for initiating a plate changing cycle for a three cycle period by means of the stepper switch 486 and the selector switch 502 is arranged to energize a circuit which resets the counter 370 back to the zero position. Such circuit includes a contact 512 connected across leads 513 and 514, in turn connected to the counter 370 to return the count thereof to the zero position.

The apparatus according to the present invention is preferably designed for addressing individual books where there are twenty-five or more subscribers in each group of such individual books. It is within the scope of the invention, however, to address a number of books within any group less than twenty-five in number, if desired.

It may be noted that the stepper switch 486 has the wiper arms 493 and 499 thereof include portions which extend 180° from each other so that while a contact 498 is in contact with point 1 on the stepper, the wiper at the opposite end thereof is in contact with point 26. Contact 25 and contact 26 are not joined electrically.

A circuit is provided which will be energized if the plate holder 45 for a subsequent group is not in proper position on the support table 188, see FIG. 4. To this end the movement of the stepper arm 493 from one to the two position thereon opens a contact 516 which is connected in series with a lead 517 branching from the power lead 402 and a lead 518. A relay winding 519 is connected in series with the lead 518 and a lead 521 connected in parallel with normally closed plate safety switches 522, seen also in FIG. 23, the circuit through said switches being maintained by a lead 523 to the other supply line 401. As seen in FIG. 23, the lowermost plate holder 45 is in its proper position for removal thereof by the transfer cylinder 198.

However, in the event one or the other switches 522 is closed by improper positioning of the bottommost plate holder 45, the relay winding 519 is energized. When relay winding 519 is energized, a circuit is closed which includes a signal buzzer 524, leads 526 and 527 and a relay contact 528, the leads 526 and 527 being connected to any convenient voltage source. The energization of the relay winding opens a contact 529 connected in series with leads 531 and 532 powering the main drive motor 34 seen in FIG. 1 to stop drive motor 34.

*Description of Operation and Circuits for Controlling Labeling Only or Imprinting Only*

The operation of the addressing and imprinting machine has been described where both the addressing and imprinting functions are had. However, and if desired, the machine can operate for addressing only or for imprinting only.

For the addressing function only, the main control switch 404 remains in the position seen in FIG. 25, and the switch 420 is moved to the "label only" position. At such time the imprinting mechanism is rendered inactive except that the ink roller motor 243 seen in FIG. 25 is driven to drive the ink rollers of the imprinter mechanism 43 in order not to introduce a "set" into the rollers. Preferably, the ink rollers are designed so as to be readily removed from the imprinter mechanism and in such cases the ink roller motor 243 is de-energized by a switch 533 connected in the supply lead 402 thereto. In the addressing only operation the counting mechanism seen in FIG. 26 is rendered inactive as is also the circuits controlling the plate changing apparatus.

When the switch 420 is moved to the "address only" position the photo-electric counting unit 39 is pulsed by the movement of each book past the light source 39a to pulse the relay 412 associated therewith and to close the contacts 414 and 475 thereof during each pulse. As before, the total counter 417 is actuated by the movement of each book. In the event of a "miss" in the feed of an individual book by the feed mechanism 40, the label feeding is halted for each "miss," so that a label is not fed while there is a gap in the movement of the books along the conveyor 44.

The circuit for halting the feed of the label strip LS to the address labeling mechanism 42 includes lead 402 at amplifier 413, contacts 414 and 419, lead 421, contact 446 closed by cam 75a at label applying head 41, and solenoid 74b.

Control of the indicia printer 42 by the cam 75a is as before, and the indicia printer 42 is likewise deactivated a partial cycle after the labeling head 41, so as to print the postal indicia on the book B moving on conveyor 44 just before a "miss" in feeding.

The stepper circuit including the stepper switch 486 is not energized since there is no pulsing of relay 489 to move switch 486 to the "station 1" position. The circuit which causes the movement of stepper switch 486 to the "station 1" position is discontinuous at switch 420. Consequently, there can be no cycling of the imprinter 43.

For the "imprinting only" function, the main control switch 404 remains in position as before, and the switch 420 is moved to the "imprint only" position. This position of switch 420 deactivates the address applying head 41 and the indicia printer 42, the imprinter mechanism 43 being cycled by a counter determined by the openings 361 in plate holder 45.

Initial operation of the plate changing mechanism is effected by operation of plate change switch 425 to energize plate change solenoid 281 as previously described. The movement of the plate holder 45 past the photo-cells 362 seen in FIG. 26 is such as to place a complement count on the counter 370.

Prior to the cycling of the imprinter 43, the movement of the book B past the photo-cell unit 39 closes a circuit to start the stepper switch 486. Such circuit includes the rectifier 491, stepper coil 489, control leads 406 and 407, closed contact 475 of photo-cell unit 39, lead 479, a lead 536 branching from lead 479 and connected to lead 422 through switch 420, contact 440 and a contact 537, a lead 538, switch 420 and a lead 539 connected to lead 401 at amplifier 476.

The circuit just described moves the stepper to "station 1," and thereafter continuity is provided through the stepper switch 486 by the lead 496. Each pulsing of the amplifier 413 continues to add to the count of counter 370 seen in FIG. 26, lead 418 being connected between amplifier 413 and counter 370.

It should be noted that when the machine is operated as an "imprint only" device, that selector switch 502 is set to a station corresponding to the number of cycles or books B between photo-cell unit 39 and imprinter 43 less the number of cycles necessary for a plate change. Assuming that "station 1" is the proper one and that counter 370 has completed a count thereon, the next book B closes contact 437 since a new count is placed on the counter 370 by pulsing of amplifier 413. If the second bank of stepper switch 486 is now at "station 1" a circuit will be completed through selector switch 502 and plate change solenoid 381 to initiate and complete a plate changing cycle. Counter 370 will again be cleared, contact 513 at plate change relay 507 opening. When contact 437 opens relay 436 will be de-energized once more to complete the count.

It will be seen from the foregoing that there has been provided a new and useful improvement in machines for addressing and labeling books. The machine according to the present invention also lends itself to the addressing operation only or the imprinting operation only, if desired.

While the invention has been described in terms of a preferred embodiment thereof, its scope is intended to be limited only by the claims here appended.

We claim:
1. In a machine operable to address and imprint flat articles such as books or the like, and to imprint said articles only, if desired, means for moving said articles, mechanism for applying an address to each article from an address strip wherein said strip comprises different groups of addresses, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the plate thereon to said moving articles, means for transferring the bottommost plate holder to said imprinting roller and for removing a previous plate holder from said imprinting roller, means on said plate holder for determining a count of articles to be printed but unaddressed, means for sensing said last named means as the plate holder moves with said transfer means, and means for rendering said addressing applying mechanism inoperative when said imprinting mechanism is imprinting the unaddressed articles of a group.

2. In a machine operable to address and imprint flat articles such as books or the like, and to imprint said articles only, if desired, means for moving said articles, mechanism for applying an address to each article from an address strip wherein said strip comprises different groups of addresses, mechanism for applying a postal indicia to each addressed article, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the plate thereon to said moving article, means for transferring the bottommost plate holder to said imprinting roller and for removing a previous plate holder from said imprinter roller, means on said plate holder for determining a count of articles to be imprinted but unaddressed, means for sensing said last named means as the plate holder moves with said transfer means, and means for rendering said addressing and postal indicia mechanism inoperative when said imprinting mechanism is imprinting the unaddressed articles of a group.

3. In a machine operable to address and imprint flat articles such as books or the like, and to imprint said articles only, if desired, means for moving said articles, mechanism for applying an address to each article from an address strip wherein said strip comprises different groups of addresses, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the plate thereon to said moving article, means for transferring the bottommost plate holder to said imprinting roller and for removing a previous plate holder from said imprinting roller, means on said plate holder for determining a count of articles to be imprinted but unaddressed, means for sensing said last named means as the plate holder moves with said transfer means, means for rendering said addressing mechanism inoperative when said imprinting mechanism is imprinting the unaddressed articles of a group, and means for sensing a separation mark on said strip and including means cooperating with said count determining means for rendering said addressing means again operative when said imprinting mechanism has completed the imprinting of the aforesaid unaddressed article.

4. In a machine operable to address and imprint flat articles such as books or the like, and to imprint said articles only, if desired, means for moving said articles, means for counting the articles so moved, mechanism for applying an address to each article from an address strip wherein said strip comprises different groups of addresses, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the plate thereon to said moving article, means for transferring the bottommost plate holder to said imprinting roller and for removing the plate holder from said imprinter roller, means on said plate holder for determining a count of articles to be imprinted but unaddressed, means for sensing said last named means as the plate holder moves with said transfer means, means for rendering said addressing mechanism inoperative when said imprinting mechanism is imprinting the unaddressed articles of a group, and means cooperating with said first named counting means and said plate holder counting means for determining when said addressing means is again operative.

5. In a machine operable to address and imprint flat articles such as books or the like, and to imprint said articles only, if desired, means for moving said articles, means for counting the articles so moved, mechanism for applying an address to each article from an address strip wherein said strip comprises different groups of addresses, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the plate thereon to said moving article, means for transferring the bottommost plate holder to said imprinting roller and for removing the plate holder from said imprinter roller, means on said plate holder for determining a count of articles to be imprinted but unaddressed, means for sensing said last named means as the plate holder moves with said transfer means, means for rendering said addressing mechanism inoperative when said imprinting mechanism is imprinting the unaddressed articles of a group, and means cooperating with said first named counting means and said plate holder counting means, including means for storing a count corresponding to the number of articles between the point where they are first counted and the number of articles moving past said imprinting mechanism in making a plate holder change.

6. In a machine operable to address and imprint flat articles such as books or the like, and to imprint said articles only, if desired, means for moving said articles, means for counting the articles so moved, mechanism for applying an address to each article from an address strip wherein said strip comprises different groups of addresses, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the plate thereon to said moving article, means for transferring the bottommost plate holder to said imprinting roller and for removing a previous plate holder from said imprinting roller, means on said plate holder for determining a count of articles to be imprinted but unaddressed, means for sensing said last named means as the plate holder moves with said transfer means, means for rendering said addressing mechanism inoperative when said imprinting mechanism is imprinting the unaddressed articles of a group, and means for sensing a separation mark on said strip in advance of said addressing mechanism including means cooperating with said first named counting means including means for storing a count corresponding to the number of articles between the point where they are first counted and the number of articles moving past said imprinting mechanism in making a plate holder change.

7. In a machine operable to address and imprint flat articles such as books or the like, and to imprint said articles only, if desired, means for moving said articles means for counting the articles so moved, mechanism for applying an address to each article from an address strip wherein said strip comprises different groups of addresses, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the platae thereon to said moving article, means for transferring the bottommost plate holder to said imprinting roller and for removing a previous plate holder from said imprinter roller, means on said plate holder for determining a count of articles to be imprinted but unaddressed, means for sensing said last named means as the plate holder moves with said transfer means, means for rendering said addressing mechanism inoperative when said imprinting mechanism is imprinting the unaddressed articles of a group, a separation mark on said strip marking the start of a new group, and circuit means cooperating with said separation mark to initiate and complete a plate holder changing cycle.

8. In a machine operable to address and imprint flat articles such as books or the like, and to imprint said articles only, if desired, means for moving said articles, means for counting the articles so moved, mechanism for applying an address to each article from an address strip wherein said strip comprises different groups of addresses, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the plate thereon to said moving article, means for transferring the bottommost plate holder to said imprinting roller and for removing a previous plate holder from said imprinter roller, means on said plate holder for determining a count of articles to be imprinted but unaddressed, means for sensing said last named means as the plate holder moves with said transfer means, means for rendering said addressing mechanism inoperative when said imprinting mechanism is imprinting the unaddressed articles of a group, a separation mark on said strip marking the start of a new group, and circuit means including an article count responsive to initiate and complete a plate holder changing cycle.

9. In a machine operable to address and imprint flat articles such as books or the like, and to imprint said articles only, if desired, means for moving said articles, means for counting the articles so moved, mechanism for applying an address to each article from an address strip wherein said strip comprises different groups of addresses, mechanism for imprinting said articles in groups corresponding to the groups of said address strip, said imprinting mechanism including a plurality of holders each with a printing plate thereon adapted to be supported on said imprinter mechanism, an imprinting roller adapted to support one of said holders and transfer an impression from the plate thereon to said moving article, means for transferring the bottommost plate holder to said imprinting roller and for removing a previous plate holder from said imprinter roller, means on said plate holder for determining a count of articles to be imprinted but unaddresesd, means for sensing said last named means as the plate holder moves with said transfer means, means for rendering said addressing mechanism inoperative when said imprinting mechanism is imprinting the unaddressed articles of a group, a separation mark on said strip marking the start of a new group, and circuit means including article count responsive means responsive also to said plate holder counting means for initiating and completing a plate holder changing cycle.

10. In an imprinting mechanism, means for supporting a stack of plate holders each having a printing plate thereon, an imprinting roller adapted to support a plate holder thereon, a transfer roller for transferring the bottommost plate holder from the stack to said imprinting roller, plate changing means including a shaft driven by said imprinting roller, a Geneva crank driven by said shaft, a clutch interposed between said Geneva crank and said shaft, a cam turning with said Geneva crank, a cam actuator contacting said cam and adapted to disengage said clutch, a Geneva follower including drive means connecting said follower with said transfer roller, a stripper cam rotating with said transfer roller, a plate stripper cooperating with said cam and adapted to strip a plate holder from said imprinting roller, and means on said transfer roller for removing the bottommost plate holder from said stack.

11. In an imprinting mechanism, means for supporting a stack of plate holders each having a printing plate thereon, an imprinting roller adapted to support a plate holder thereon, a transfer roller including means thereon for engaging the leading edge of the bottommost plate holder and transferring the same to said imprinter roller, plate changing means including a shaft driven by said imprinting roller, a Geneva crank driven by said shaft, a clutch interposed between said Geneva crank and said shaft, a cam turning with said Geneva crank, a cam actuator contacting said cam and adapted to disengage said clutch, a Geneva follower including drive means connecting said follower with said transfer roller, a stripper cam rotating with said transfer roller, and a plate stripper cooperating with said cam and adapted to strip a plate holder from said imprinting roller.

12. In an imprinting mechanism, means for supporting a stack of plate holders each having a printing plate thereon, means for separating the bottommost plate holder from the other lying atop thereof, an imprinting roller adapted to wrap a plate holder thereon, a transfer roller including means thereon for engaging the bottommost plate holder and transferring the same to said imprinter roller, plate changing means including a shaft driven by said imprinting roller, a Geneva crank driven by said shaft, a clutch interposed between said Geneva crank and said shaft, a cam turning with said Geneva crank, a cam actuator contacting said cam and adapted to disengage said clutch, a Geneva follower including drive means connecting said follower with said transfer roller, a stripper cam rotating with said transfer roller, and a plate stripper cooperating with said cam and adapted to strip a plate holder from said imprinting roller.

13. In an imprinting mechanism, means for supporting a stack of plate holders each having a printing plate thereon, an imprinting roller adapted to support a plate holder thereon, a transfer roller for transferring the bottommost plate holder from the stack thereof to said imprinter roller, plate changing means including a shaft driven by said imprinting roller, a Geneva crank driven by said shaft, a clutch interposed between said Geneva crank and said shaft, a cam turing with said Geneva crank, a cam actuator contacting said cam and adapted to disengage said clutch, a Geneva follower including drive means connecting said follower with said transfer roller, a stripper cam rotating with said transfer cylinder, a plurality of annular grooves on said imprinting roller, and a plate stripper cooperating with said cam and having stripper fingers thereon adapted to enter said annular grooves to strip a plate holder from said imprinting roller.

14. In an imprinting mechanism, means for supporting a stack of plate holders each having a printing plate thereon, each of said plate holders being formed from thin metal stock and having magnetic reinforcing means at the leading and trailing edges thereof, an imprinting roller adapated to support a plate holder thereon, magnetic holding means on said imprinting roller for holding the leading and trailing edges of said plate holder, a transfer roller for transferring the bottommost plate holder from the stack thereof to said imprinter roller, plate changing means including a shaft driven by said imprinting roller, a Geneva crank driven by said shaft, a clutch interposed between said Geneva crank and said shaft, a cam turning with said Geneva crank, a cam actuator contacting said cam and adapted to disengage said clutch, a Geneva follower including drive means connecting said folllower with said transfer roller, a stripper cam rotating with said transfer roller, a plate stripper cooperating with said cam and adapted to strip a plate holder from said imprinting roller, and means on said transfer cylinder for removing the bottommost plate holder from said stack.

15. In an imprinting mechanism, means for supporting a stack of plate holders each having a printing plate thereon, each of said plate holders being formed from thin metal stock and having magnetic reinforcing means at the leading and trailing edges thereof, an imprinting roller adapted to support a plate holder thereon, magnetic holding means on said imprinting roller for holding the leading and trailing edges of said plate holder, a transfer roller for transferring the bottommost plate holder from the stack thereof to said imprinter roller, plate changing means including a shaft driven by said imprinting roller, a Geneva crank driven by said shaft, a clutch interposed between said Geneva crank and said shaft, a cam turning with said Geneva crank, a cam actuator contacting said cam and adapted to disengage said clutch, a Geneva follower including drive means connecting said follower with said transfer roller, a stripper cam rotating with said transfer roller, a plurality of annular grooves on said imprinter roller, a plate stripper cooperating with said cam and having stripper fingers thereon adapted to enter said annular grooves to strip a plate holder from said imprinting roller, and means on said transfer roller for removing the bottommost plate holder from said stack.

16. In a machine operable to address and imprint flat articles such as books or the like, and to imprint said articles only, if desired, means for moving said articles, mechanism for applying an address to each article from an address strip wherein said strip comprises different groups of addresses, mechanism for imprinting said articles in groups corresponding to the groups of said address strip, said mechanism including a plurality of holders each with a printing plate thereon, an imprinting roller adapted to support one of said holders and transfer an impression from the plate thereof to said moving articles, means for transferring one of said plurality of plate holders from a stack thereof to said imprinting roller and for removing a previous plate holder from said imprinting roller, means on said plate holder for determining a count of articles to be imprinted but unaddressed, means for sensing said last named means as the plate holder moves with said transfer means, and means for rendering said addressing mechanism inoperative when said imprinting mechanism is imprinting the unaddressed articles of a group.

17. In a machine operable to address and imprint flat articles such as books or the like, and to imprint said articles only, if desired, means for moving said articles, mechanism for applying an address to each article from an address strip wherein said strip comprises different groups of addresses, mechanism for imprinting said articles in groups corresponding to the groups of said address strip, said mechanism including a plurality of holders each having a printing plate thereon, an imprinting roller adapted to support one of said holders and transfer an impression from the plate thereon to said moving articles, means for transferring one of said plurality of said plate holders to said imprinting roller and for removing a previous plate holder from said imprinting roller, means on each of said plate holders for determining a count of articles to be imprinted but unaddressed, means for sensing said last named means as the plate holder moves with said transfer means, and means for rendering said addressing mechanism inoperative when said imprinting mechanism is imprinting the unaddressed articles of a group.

References Cited in the file of this patent

UNITED STATES PATENTS

| | | |
|---|---|---|
| 1,108,583 | Johnson et al. | Aug. 25, 1914 |
| 1,206,345 | McMillan | Nov. 28, 1916 |
| 2,731,910 | Gruver | Jan. 24, 1956 |
| 2,774,302 | Stromme | June 8, 1954 |
| 2,919,640 | Ritzerfield et al. | Jan. 5, 1960 |